(12) United States Patent
Falconer et al.

(10) Patent No.: US 12,404,460 B2
(45) Date of Patent: Sep. 2, 2025

(54) SYSTEM AND METHOD FOR PROCESSING FEEDSTOCK WITH VOLATILE COMPONENTS

(71) Applicants: Ross A Falconer, Lake County, CA (US); Robert P. W. Miller, Friday Harbor, WA (US); Paul F Ndione, Lakewood, CO (US)

(72) Inventors: Ross A Falconer, Lake County, CA (US); Robert P. W. Miller, Friday Harbor, WA (US); Paul F Ndione, Lakewood, CO (US)

( * ) Notice: Subject to any disclaimer, the term of this patent is extended or adjusted under 35 U.S.C. 154(b) by 376 days.

(21) Appl. No.: 17/786,759

(22) PCT Filed: Dec. 18, 2020

(86) PCT No.: PCT/US2020/066248
§ 371 (c)(1),
(2) Date: Jun. 17, 2022

(87) PCT Pub. No.: WO2021/127590
PCT Pub. Date: Jun. 24, 2021

(65) Prior Publication Data
US 2023/0020430 A1    Jan. 19, 2023

Related U.S. Application Data

(60) Provisional application No. 62/949,892, filed on Dec. 18, 2019.

(51) Int. Cl.
*C10G 7/12*    (2006.01)
*B01D 3/04*    (2006.01)
(Continued)

(52) U.S. Cl.
CPC ............... *C10G 7/12* (2013.01); *B01D 3/04* (2013.01); *B01D 3/42* (2013.01); *B01D 5/006* (2013.01);
(Continued)

(58) Field of Classification Search
CPC .... C10G 7/12; C10G 31/06; C10G 2300/301; C10G 2300/4006; C10G 2300/4043;
(Continued)

(56) References Cited

U.S. PATENT DOCUMENTS 5,298,151 A    3/1994  Steinberg et al.
10,787,612 B2  9/2020  Swiss et al.
(Continued)

OTHER PUBLICATIONS

Invitation to Pay Fees dtd Mar. 1, 2021 for Application PCT/US20/66248 "System and Method for Processing Feedstock With Volatile Components", 3 Pages.
(Continued)

*Primary Examiner* — Randy Boyer
*Assistant Examiner* — Juan C Valencia
(74) *Attorney, Agent, or Firm* — K-T Legal, PLLC; Bea Koempel-Thomas

(57) ABSTRACT

Methods and apparatus for processing hydrocarbon and other feedstocks that contain lighter volatile component(s) along with heavier volatile or non-volatile component(s) and/or contaminant(s). The principal benefit being that a feedstock can be processed and separated into its distinct volatile components down to elemental and/or molecular levels, including the ability to handle the heaviest tars and bitumen within the system. This effectively provides onsite value add to the feedstock resource (minus the waste streams such as water, sulfur, or sand; which may have value as isolated components in their own right). The system is robust and can include innovative hardware, methods, and/
(Continued)

or software. The system can isolate water, chemical, various hydrocarbon, and particle contaminants of arbitrary concentrations and sizes. These factors provide for significant increases in processing efficiencies and capabilities in the fields of refining and environmental recovery. In a variety of operating scenarios, near-zero emissions can be achieved while processing.

20 Claims, 15 Drawing Sheets

(51) Int. Cl.
    *B01D 3/42*     (2006.01)
    *B01D 5/00*     (2006.01)
    *C10G 31/06*     (2006.01)

(52) U.S. Cl.
    CPC ....... *C10G 31/06* (2013.01); *C10G 2300/301* (2013.01); *C10G 2300/4006* (2013.01); *C10G 2300/4043* (2013.01); *C10G 2300/405* (2013.01)

(58) Field of Classification Search
    CPC ...... C10G 2300/405; C10G 7/00; B01D 3/04; B01D 3/42; B01D 5/006
    See application file for complete search history.

(56) References Cited

U.S. PATENT DOCUMENTS

| | | | |
|---|---|---|---|
| 10,787,616 | B2 | 9/2020 | Seccombe et al. |
| 2005/0204774 | A1 | 9/2005 | Foglietta et al. |
| 2006/0283207 | A1 | 12/2006 | Pitman et al. |
| 2016/0256842 | A1 | 9/2016 | Evans et al. |
| 2017/0260461 | A1* | 9/2017 | Seccombe .............. C10G 31/06 |
| 2018/0220552 | A1* | 8/2018 | Arcot ...................... F28D 15/02 |
| 2018/0283813 | A1 | 10/2018 | Victor et al. |
| 2019/0101336 | A1 | 4/2019 | Victor et al. |
| 2019/0241819 | A1 | 8/2019 | Van Willigenburg |
| 2021/0102126 | A1* | 4/2021 | Dyer ...................... C10G 55/04 |

OTHER PUBLICATIONS

International Preliminary Report on Patentability for PCT Application No. PCT/US20/66248.

PCT Search Report and Written Opinion mailed Apr. 27, 2021 for PCT Application No. PCT/US20/66248, 17 pages.

Matysek, A., Ford, M., Jakeman, G., Curtotti, R. Schneiderr, K., Ahammad, H., and Fisher, B. Near Zero Emissions Technologies, Jan. 2005, 93 pp. ABARE eReport 05.1 Prepared for the Department of Industry, Tourism and Resources, Canberra, Australia.

Matthews, H.D. and Caldeira, K., Stabilizing Climate Requires Near-Zero Emissions, Feb. 2008, 5 pp., Geophysical Research Letters, vol. 35, L04705, doi:10.1029/2007GL032388.

Pachauri, R.K. and Meyer, L.A. (eds.), IPCC, 2014: Climate Change 2014: Synthesis Report, 2014, 151 pp., Contribution of Working Groups I, II and III to the Fifth Assessment Report of the Intergovernmental Panel on Climate Change, Geneva, Switzerland.

Arias, H., Sustainable Freight: Pathways to Zero and Near-Zero Emissions—A Discussion Document, 2015, 96 pp., California Environmental Protection Agency Air Resources Board.

Hosker, E. and Justus, D. (eds.), World Energy Outlook, 2019, 810 pp., International Energy Agency, retrieved Mar. 18, 2025 from https://iea.blob.core.windows.net/assets/98909c1b-aabc-4797-9926-35307b418cdb/WEO2019-free.pdf.

OGCI Members, Scaling Up Action Aiming for Net Zero Emissions, A Report from the Oil and Gas Climate Initiative, Sep. 2019, 76 pp., Oil and Gas Climate Initiative, retrieved Mar. 18, 2025 from https://www.ogci.com/wp-content/uploads/2023/04/OGCI-Annual-Report-2019.pdf.

* cited by examiner

SYSTEM AND METHOD FOR PROCESSING FEEDSTOCK WITH VOLATILE COMPONENTS

This application claims priority to U.S. Provisional Patent Application No. 62/949,892 filed Dec. 18, 2019, the contents of which is incorporated herein by reference in its entirety and for all purposes.

BACKGROUND

Since the 1870s oil refineries have been built and operated in basically the same way. Because of the great quantities of thermal energy lost into the ambient environment associated with conventional refinery atmospheric and vacuum fractionating towers, reflux processes, and residue processing operations, refineries are conventionally large structures to effect economies of scale. Refineries are also conventionally large structures, so the exhaust stacks and cooling towers reach high enough into the air to avoid presenting immediate health risks to the humans below. The costs, in terms of money, time, and environmental impact associated with the design, construction, and permitting of conventional refineries is tremendous. In fact, only one large scale conventional refinery has been built in the United States since 1977, when Marathon Petroleum opened its 200,000 blue-barrel per day (bbl/day) facility in Garyville, Louisiana. In 2020, it is estimated that the monetary cost for a turnkey installation like Marathon's 40+ year old conventional refinery would far exceed $4 billion USD (or more than $20,000 per bbl rated daily production capacity). Accordingly, conventional refineries and the processes they employ to refine feedstock present problems ripe for new and improved solutions to improve efficiency and reduce costs.

SUMMARY

The present disclosure describes a system and method for processing hydrocarbon feedstocks (or any feedstocks with volatile components) into distinct and separated light through heavy volatile components (condensate products), and very heavy volatile components and/or non-volatile residues.

The present disclosure describes a highly adaptable system and method for processing volatile feedstocks (generally including the category of hydrocarbon refining). The system and method is adaptable for processing other mixed feedstocks with volatile and or non-volatile components or contaminants (such as sand and/or water contaminated crude oils; residual oils from other industrial processes: mixed slop oils: plant based oils; water reservoirs contaminated with oils or oil emulsions, chemicals, or salts; or oil spills which have settled in such a way that recovery and separation using this process is possible, such as oil slicks floating on a large body of water or oil spills which have settled onto the bottom of a bay or estuary, for examples). This document describes a system and/or apparatus comprising a Feedback Preheat and Pressure Step Down Vapor Flash System that can prepare the feedstock during its passage from onsite storage vessels into a Conversion Vessel with an integral Hybrid Phase Change Accelerated Vaporization Process, and a connecting network of Thermal Information Exchangers (TIEs) with an associated array of Collection Vessels: wherein these elements are combined into a unified Feedback Closed Loop Vapor Transport System which is used to process hydrocarbon (or other) feedstocks using a Binary Process Distillation (BPD).

According to a method of the present disclosure, a broad spectrum of hydrocarbons and/or other volatile feedstock components or contaminants are efficiently prepared in a Feedback Preheat and Pressure Step Down Vapor Flash System and subsequently further heated and vaporized within a Conversion Vessel under controlled pressures and incorporating a Hybrid Phase Change Accelerated Vaporization Process. These vaporized volatile components are subsequently transported as vapors through a piping network which includes an array of TIEs. As used herein, a TIE includes an intelligent heat exchanger that can facilitate monitoring and reporting and can accomplish variable throttling and/or control. These TIEs are interconnected with successive downstream Collection Vessels, and they each operate at successively lower and controlled downstream flow enthalpies. Each TIE is connected to (single or multiple) Programmable Automated Controller(s) or similar which can monitor and adjust the inter-related Procedural Control Parameters. This enables real-time targeted product optimization within the overall BPD.

This system and method may be used for precisely separating, isolating, and collecting vaporized distillates which are the constituent volatile components of the liquid feedstock being processed in the system. Once vaporized, the distillate components are then transported into each of the successive "downstream" TIEs, and these are connected to one another in a Feedback Closed Loop Vapor Transport System. This system contributes to the overall thermal recovery and conservation between the heating and cooling functions being controlled within each successive TIE, which greatly increases thermal efficiency. During the return "upstream flow", the remaining cooled distillate vapors and dried carrier gases pass back through the TIEs, whether configured in serial, parallel, or bypass modes. The TIEs can intelligently monitor and/or exchange thermal information between the "downstream" and "upstream" combined distillate vapor and carrier gas flows, recycling much of the thermal energy back into the "upstream" flow, before then being returned to the heated Conversion Vessel through a submerged diffuser interface. The diffuser interface is designed to provide a very low pressure drop across the interface; and creating very small, very low velocity, and low energy bubbles rising towards the surface within the feedstock liquid, with the desired goal of creating minimum surface turbulence along with maximum bubble/vapor transport. Full Spectrum Single Pass Precision Feedstock Separation can be achieved with nearly 100% feedstock resource utilization through the use of this network of intermediate TIEs between the Conversion Vessel (which incorporates the driving thermal energy sources), and a Chiller Apparatus located at the distal end of the Feedback Closed Loop Vapor Transport System (which incorporates the counter-driving thermal energy sink). Each TIE creates a specific condensate product which has accurately defined upper and lower condensation temperature bounds at the given pressure within each of the TIEs; and these condensate product liquids are deposited in each associated Collection Vessel. In general, the condensate products with the highest condensation temperatures are condensed and collected first, and successively cooler-condensing condensate products are collected in successive order as temperatures and pressures of the vaporized distillates are controlled, with the remaining distillate vapors and carrier gas then being transported "downstream" within the piping along the Feedback Closed Loop Vapor Transport System. In some examples, placing a Pump or Blower Apparatus ahead (upstream) of any TIE can increase or decrease the pressure of the vaporized distillates being passed through its piping, which typically results in a lowering of the condensation temperatures of those distillates. Multiple Pumps or Blower Apparatus can be placed into this system ahead ("upstream") of multiple TIEs, for example, which can control pressures within each TIE in order to maintain fine control over quality and production rate for each condensate product. This has special application when fine-tuning adjacent immiscible cuts into a single Collection Vessel, such as water and light hydrocarbon condensate, which may condense within the same temperature bound within a TIE at some point along a pressure curve, but not within the same temperature bound but another pressure being controlled throughout the rest of the Feedback Closed Loop Vapor Transport System. In this type of example, the associated Collection Vessel would need to have two or more drains and associated condensate delivery pumps or Blowdown Pipes, with the levels of each of the condensate products maintained such that a more dense cut passes out through a lower drain, and a less dense cut passes out through an upper drain. Each Thermal Information Exchanger is configured in such a way as to facilitate collecting immiscible condensate products into the associated Collection Vessel. In particular, each TIE has individual chambers within its horizontal orientation which collect a subset of the range of vaporized distillates being condensed within the TIE inlet and outlet temperature bounds at constant pressure. The TIE shown have three (FIG. 1 and FIG. 2) or four (FIG. 3) drain pipes emerging from the bottom, one from each of these chambers, more or less chambers with drain pipes are optional. In some examples, each drain pipe can be configured to deposit liquid condensate products at the desired stratification level within the associated collection vessel, which greatly aids in maintaining the separation of marginally immiscible condensate products. By closely monitoring the pressure data from each of the multiple pressure transmitters, level control is maintained for each of the separated and immiscible condensate products being stratified within the Collection Vessel, which simplifies accurate pumping and removal of each product. When positive displacement Blower Apparatus or similar are used to step pressures up and down between TIEs, it is possible to drive a positive displacement compression function in one portion of the system by using a corresponding positive displacement decompression function in another portion of the system and vice versa (motors may be connected electrically, mechanically, or fluidically, for example); regulating velocity, temperature, and pressure through the TIEs aids in efficient enthalpy recovery in both the kinetic and thermal information domains.

The process incorporates a Blower Apparatus to drive the vaporized feedstock distillates through the Feedback Closed Loop Vapor Transport System with interconnected TIEs and interconnected Piping. This process can effect efficient separation and production of very light through very heavy volatile condensate products and/or contaminants to be collected and deposited into successive Collection Vessels, and heavier through very heavy volatile and/or non-volatile residues and contaminants to remain in and settle or stratify at various levels within the Conversion Vessel (or within the Collection Vessels, in the case of immiscible volatile components and/or contaminants) for isolation and removal: all with priority given to desired software control parameters of efficiency, capacity, quality, flexibility, feedstock sensitivity, market forces, jurisdictional requirements, industry specifications, and/or as the requirement may demand.

BRIEF DESCRIPTION OF DRAWINGS

The detailed description is described with reference to the accompanying figures. The same reference numbers in different figures indicate similar or identical items.

FIG. 3A is from a right-front perspective: FIG. 3B is from a left-front perspective: FIG. 3C is from a left-back perspective; and FIG. 3D is from a right-back perspective.

DETAILED DESCRIPTION

Figure 1:
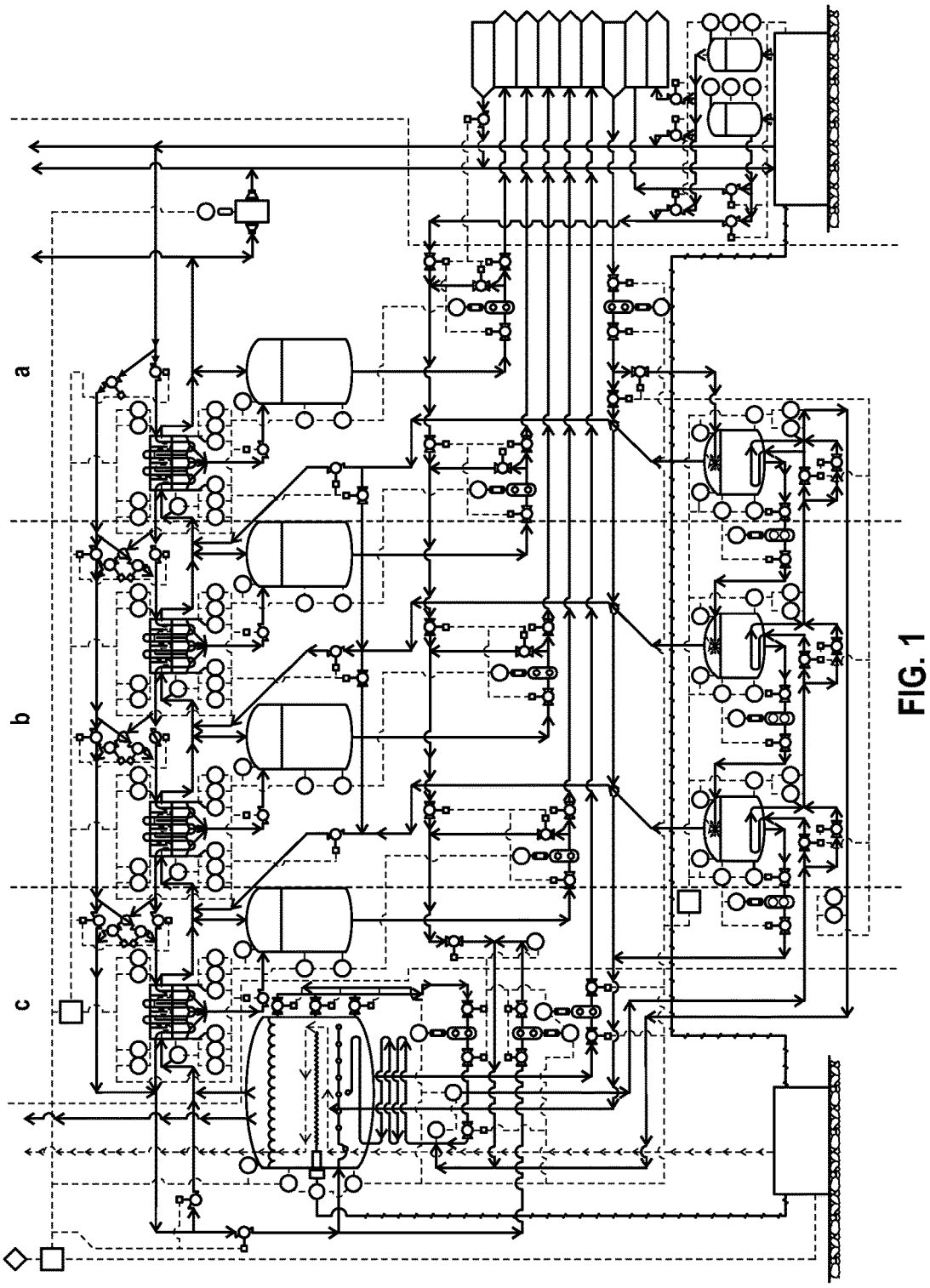
FIG. 1 illustrates an example processing system including features to process feedstock into light through heavy volatile components and volatile and/or non-volatile residue of arbitrary spec as described herein. Sections a, b, and c are designated for FIG. 1 and each is also presented separately as FIG. 1A, FIG. 1B, and FIG. 1C for ease of review.

The foregoing summary, as well as any detailed description, is better understood when read in conjunction with the drawings and figures, which make up a part of this disclosure. For the purpose of illustration, the drawings and figures show certain illustrative examples. It is understood, however, that the claims are not limited to the specific systems, methods, and/or apparatuses/devices disclosed in such drawings or figures.

While the system and method presented herein are described with reference to illustrated examples, it should be understood by those skilled in the art that various changes may be made, equivalents may be substituted for elements and/or operations thereof, and/or some operations may be omitted without departing from the scope of the inventive concepts described herein. In addition, many modifications may be made to adapt a particular situation or material to the teachings herein without departing from the essential scope thereof. Therefore, it is intended that the appended claims not be limited to the particular examples described, and that the claims will cover features of the described examples (and equivalents thereof).

The present disclosure describes a system and method that can provide a viable alternative to conventional or legacy refinery systems, can solve many of the environmental issues associated with conventional refinery systems, can deliver high production with high quality and low costs, and when multiple Units of the system described herein are deployed as a Refining Plant, this new style of refinery can be constructed with any number of Modular Units to provide for any daily processing capacity desired, depending on finance and resource factors, with virtually any future capacity added over time without compromising either physical process efficiency or bottom line Return On Investment. Capitalization costs for this new style of refinery can be about one-order-of-magnitude lower when compared with conventional mainline refineries.

The system and method that are the focus of this disclosure can have added benefits, as well: including transportability, scalability, flexibility, reliability, and/or multiple redundancies; all of which can be used in commercial and industrial settings, by the military, on the frontiers of remote locations, and/or in third world countries.

In several examples, the system and method described herein can work alongside existing refinery infrastructure by helping to recover oil field resource spills, preparing pipeline crude oil by removing contaminants just prior to delivery to a legacy refinery, and/or by acting as a temporary and relocatable standby refinery when the regional conventional or legacy refinery must be taken offline, sometimes for months, for repairs or upgrades.

Binary Process Distillation (BPD) Configuration & Functions

The present disclosure describes a BPD apparatus for processing hydrocarbon or other volatile feedstocks including a relatively hot module herein called the Conversion Vessel, and a series of successively cooled modules hereinafter called Collection Vessels. The hydrocarbon (or other) feedstocks introduced into the Conversion Vessel are converted into useful products through a process called Binary Process Distillation (BPD). During this process, a broad spectrum of volatile hydrocarbon distillates can be vaporized in the Conversion Vessel (as well as in the Feedback Preheat and/or Pressure Step Down Vapor Flash System) and transported through TIEs at successively lower thermal and/or mass flow energies. Collection Vessels can be associated with each of the TIEs. Collection Vessels can be used for isolating individual condensate products (or multiple isolated condensate products by using innovative strategies such as stratification and/or immiscibility of the adjacent condensate products), which can be created during the passage of the transported distillate vapors through the TIEs. The TIEs are each able to condense a different discrete portion of the entrained distillate vapors.

The distillates possessing the lowest vapor pressures (usually the heaviest distillates in the entrained vapor stream) can be condensed first while enthalpy is successively reduced within each TIE along the Feedback Closed Loop Vapor Transport System Piping, and in exchange with increasing the enthalpy of the flowing mass of remaining vaporized distillates and dried carrier gas returning to the Conversion Vessel in the counter-flow direction. These processes can occur substantially simultaneously through the TIEs and their network of piping, and this can allow for recycle of both the thermal energy and mass flow during reentry into the Conversion Vessel and the Hybrid Phase Change Accelerated Vaporization Process associated with the Conversion Vessel. The Feedback Preheat and Pressure Step Down Vapor Flash System can also provide for the most volatile distillate vapors to be introduced into the Feedback Closed Loop Vapor Transport System directly, without their mass being fully heated and vaporized in the Conversion Vessel. This can reduce the overall energy input requirement for heating and can increase the effectiveness of the cooling performance of the system, as relatively much cooler distillate vapors can be introduced at any location along the network of Feedback Closed Loop Vapor Transport System Piping, with the limitation being that the location is "upstream" of the TIE that is controlling enthalpies, which would condense those distillate vapors, and "downstream" of the "upstream" TIE's Collection Vessel venting. This can result in a significant increase in energy efficiency, production performance, and an overall reduction in emissions of the system.

The condensed product liquids created within each TIE can be piped into each of the corresponding Collection Vessels; and the Vapor Chambers, which can be maintained above the surface levels of the condensate products stored within each of the Collection Vessels, can be vented back into the piping network just "downstream" of the corresponding TIE at approximately equal pressures: this allows for effective venting of this volume while preventing the possibility of contamination from adjacent condensate products or other pressure zones within the process. The disclosed BPD with integral Feedback Closed Loop Vapor Transport System, Hybrid Phase Change Accelerated Vaporization Process, and Feedback Preheat and Pressure Step Down Vapor Flash System can provide both high efficiency and high production rates with near-zero emissions; both of these characteristics are inter-related and are highly desired by those skilled in the art within this industry segment.

Each Collection Vessel in the array of Collection Vessels does not require a dedicated heating element within the Collection Vessel during processing (A nominal heating element or heat transfer fluid tubing may be desirable in some instances to assist with cold-start operations after a shutdown, for example: but this is not a required part of the overall description of the functioning apparatus, while it is operating). Rather, Thermal Information Exchange can occur within the network of TIEs in which the network can communicate real-time thermal and mass flow information bi-directionally (full-duplex mode) between successive modules during processing (in various examples, the TIEs can be connected in series and/or parallel and/or bypass modes); transient configurations of TIEs can be determined and/or controlled by an intelligent Programmable Automation Controller (PAC) or similar computer functions. Enthalpy exchange and, by design, optimized recovery can occur within each TIE as BPD input energies are balanced by the PAC across the driving hot side of the BPD to the counter-driving cold side of the BPD against the mass inflows (feedstock), mass outflows (dynamic totals of separated condensate products), and mass transport (vaporized feedstock distillates plus carrier gases) through the networked system of connected piping and TIEs (the system being the Feedback Closed Loop Vapor Transport System, which can be monitored and/or controlled in real-time by the networked PAC associated with multiple sensors, at least some of which can be interconnected).

During processing, the Heating function(s) can drive the highest temperature portions of the Feedback Closed Loop Vapor Transport System, can be associated with the Conversion Vessel itself, and can be integral to the overall BPD. The Chiller function(s) can drive the lowest temperature portions of the Feedback Closed-Loop Vapor Transport System, can also be integral to the overall BPD, and can participate in pressure regulation functions within the overall Feedback Closed Loop Vapor Transport System. Except for the most volatile distillates contained within the given feedstock, which in some examples can be vaporized within the Feedback Preheat and Pressure Step Down Vapor Flash System and transported to various "downstream" Feedback Closed Loop Vapor Transport System Piping prior to entry into a corresponding TIE for condensation and collection, the desired distillate components within the feedstock can be vaporized within the Conversion Vessel alone (also excepting the case where additional Chiller functionality may be used during controlled venting of the stored natural gas liquids/liquified natural gas (NGL/LNG) liquids back into the Feedback Closed Loop Vapor Transport System Piping, which can aid in maintaining pressures within the overall BPD. For example, high pressure LNG may be directly vaporized and vented back into the piping of the Feedback Closed Loop Vapor Transport System as a cold gas and used to maintain a constant pressurization within the overall system).

The aforementioned controlled venting can support the maintenance and integrity of the completely closed-loop nature of a system for processing feedstock with volatile components as described herein, for example, with respect to net custodial mass flow losses which are effectively zero. Therefore, the BPD is able to achieve near zero environmentally sensitive emissions, as well. Each TIE can provide precise separation of the distillate components of the vaporized feedstock into corresponding individual condensate products, which have corresponding well defined physical characteristics including but not limited to condensation pressure and temperature, density, and miscibility. This precise separation of the vaporized feedstock distillate components can occur within each TIE in succession, with each successive liquid condensate being condensed at correspondingly lower successive temperatures at a given pressure. In examples, each individual TIE can monitor and control, in some instances continually, both the upper and lower condensation temperature boundaries of the desired condensate products being isolated into each of the successive and associated Collection Vessels. A vapor transport Blower Apparatus or Compressor Pump (optionally located between any of the TIEs) may increase or reduce the associated pressure and temperature on the vaporized feedstock distillate in the associated TIE prior to condensation into a liquid and storage as a condensate product in the associated Collection Vessel.

Feedback Closed Loop Vapor Transport System

A conventional monolithic mainline refinery is not a closed loop system. Instead, conventional monolithic mainline refineries exhibit a continuous massive heat dump into the environment through a series of distillation towers, with a high energy-input-factor reflux providing the desired cut purity and other characteristics. In contrast, the disclosed Feedback Closed Loop Vapor Transport System (associated with the BPD) exhibits Closed Loop Thermal and Closed Loop Vapor Mass Transport performance in the Kinetic and/or Thermal Domains, which among other benefits can allow for increased efficiencies, responsiveness, control, safety, and/or improved emissions factors associated with prime input energy production and/or distribution. By recycling the thermal energy flowing through the system and achieving the desired feedstock separation of vaporized distillates into distinct condensate products in one step, overall energy requirements can be greatly reduced. Likewise, the hydrocarbon emissions associated with fossil fuel derived energy production can also be greatly reduced. When prime input energy is provided in the way of green energy sources such as wind or solar, the BPD disclosed herein may be classified as zero emissions.

The present disclosure describes methods and systems that can directly control and conserve both the dynamic pressure and mass flow (kinetic information), as well as the enthalpy flow (thermal information) of the system, aspects of the Feedback Closed Loop Vapor Transport System as part of the BPD. If, in one of the TIEs, a certain amount of thermal energy is required to be removed in order to effect a reduced temperature phase change involving latent heat of vaporization for a portion of the vaporized distillates flowing "downstream" so that the vaporized distillates become a distinct condensate product, equal amounts of thermal energy can be transferred back into the Feedback Closed Loop Vapor Transport System for recycle into the Conversion Vessel, including up to and/or all of the thermal energy required to effect the phase change from gas vapor to liquid, plus any temperature changes of the distillate gas vapor and/or the resulting condensate product liquid from the initial gas temperature to the final liquid temperature, at constant pressure within the TIE. In examples, this thermal information exchange is 100% efficient since pressures are effectively held constant during this period within (each of) the TIE(s). Since each TIE can provide for steady individual control of the inlet temperature and outlet temperature as part of the overall network, a consistent range of distillate vapors can be condensed into each of the associated Collection Vessels, which results in each specific condensate product or "cut" being collected.

The Closed Loop Vapor Transport System (including Closed Loop Vapor Mass Transport and Closed Loop Thermal Transport) can maintain this high efficiency performance in both the Kinetic and Thermal Domains for the vaporized feedstock distillates associated with the "upstream" vapor transport into the Hybrid Phase Change Accelerated Vaporization system associated with the Conversion Vessel, as well. Stated another way: because the system incorporates a closed mass transport loop and a closed thermal loop, there is an opportunity for precisely determined and controlled thermal transfer and conservation (as opposed to merely heat dump waste). With multiple networked TIEs working together in an intelligently controlled manner (using a multiplicity of sensors and PAC), the input energy requirements for thermal, pressure, and mass flow sources to drive the process into thermal, pressure, and mass flow sinks can be greatly reduced, especially when compared to conventional mainline refineries. After the relatively "high enthalpy" and "low enthalpy" areas within the process are configured and stable, the system can run very efficiently, with greatly reduced requirements for input heat or massive cooling. Startup operations can be eased when systems for initial heating of the feedstock within the Conversion Vessel and/or Collection vessels intended for heavy/viscous products, which may have cooled and hardened significantly, are included. Startup operations can be eased when additional piping is included to return the various condensate products from each Collection Vessel back to the Conversion Vessel when these condensate products are not meeting required criteria, for example, when performing a cold start after an unexpected shutdown, a change in condensate product ratios or criteria, and/or during early AI enhanced testing of a new feedstock.

Two basic sources of input energy can be used, the sources including either electrical resistance heating coupled with electromechanical cooling, as when connected to a local or regional electrical power grid, and/or hydrocarbon combustion heating coupled with engine-generator driven electrical resistance heating and mechanical and/or electro-mechanical cooling, as when deployed as a self-contained skid mounted Modular Unit package able to separate its own condensate product fuels from a readily available onsite feedstock. These two examples were chosen in order to illustrate the versatility of the system, and its ability to integrate with virtually any source of energy, especially environmentally friendly sources such as wind and solar power, or frontier ready sources such as diesel or kerosene which can fuel diesel or gas turbine electrical generators to power the BPD itself, and can provide electrical and/or thermal power to the surrounding developing infrastructure in which a fully self-contained Modular Unit Refinery Plant utilizing this technology might be deployed. Operating the system with electricity from a utility or installed renewable energy source can render it effectively pollution free from a local perspective. However, the wider perspective often shows that the prime energy source is frequently derived from hydrocarbon combustion powered electrical generators which would be located many tens or hundreds of miles away from the BPD Plant. Typically, this electrical energy is largely lost during its long-distance transmission along high-tension wires. The greatly reduced energy input requirements, from whatever source, of the BPD with integral Feedback Closed Loop Vapor Transport System, as described herein, can also greatly reduce environmentally sensitive hydrocarbon emissions from these sources as well.

Figure 1A:
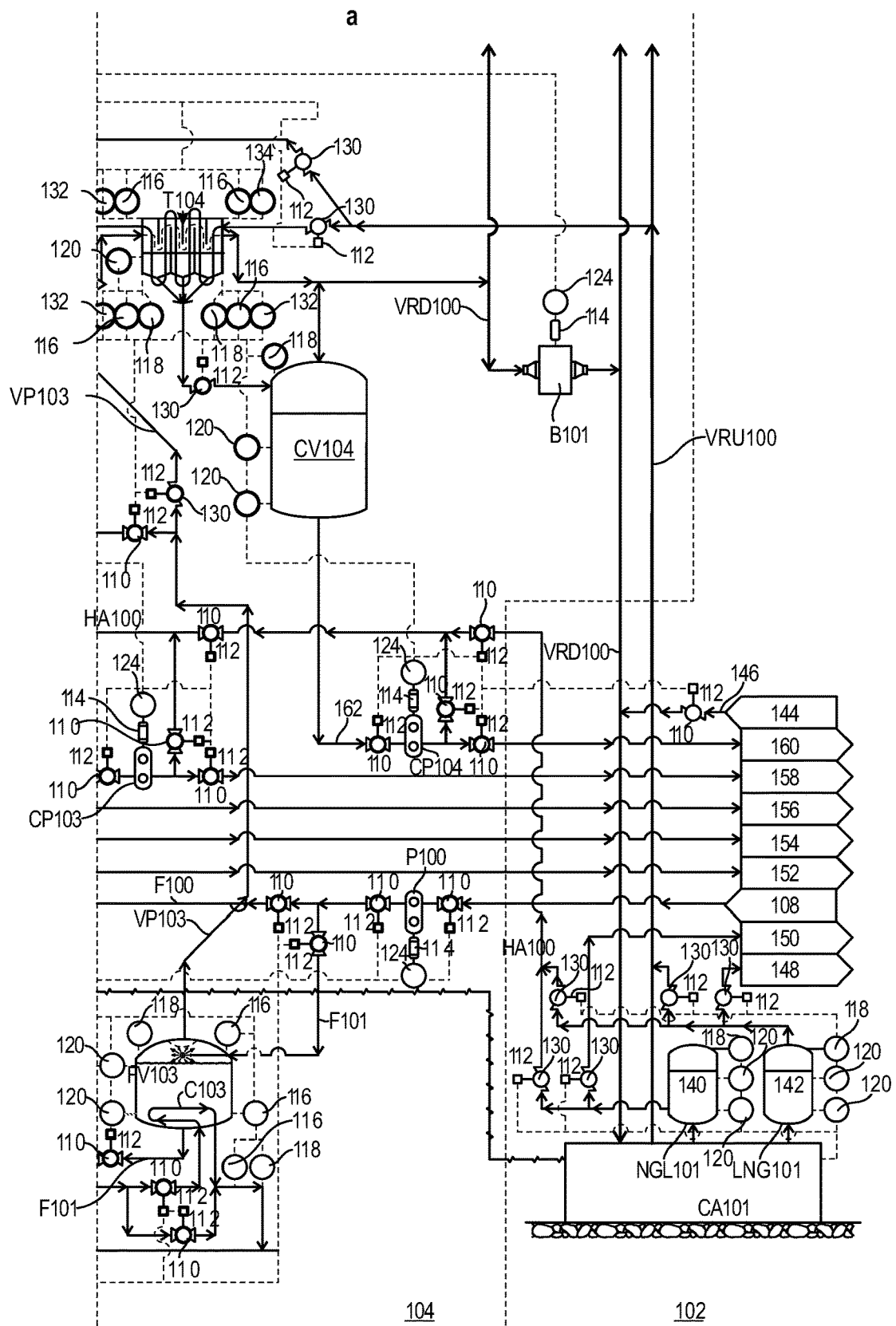
Figure 1B:
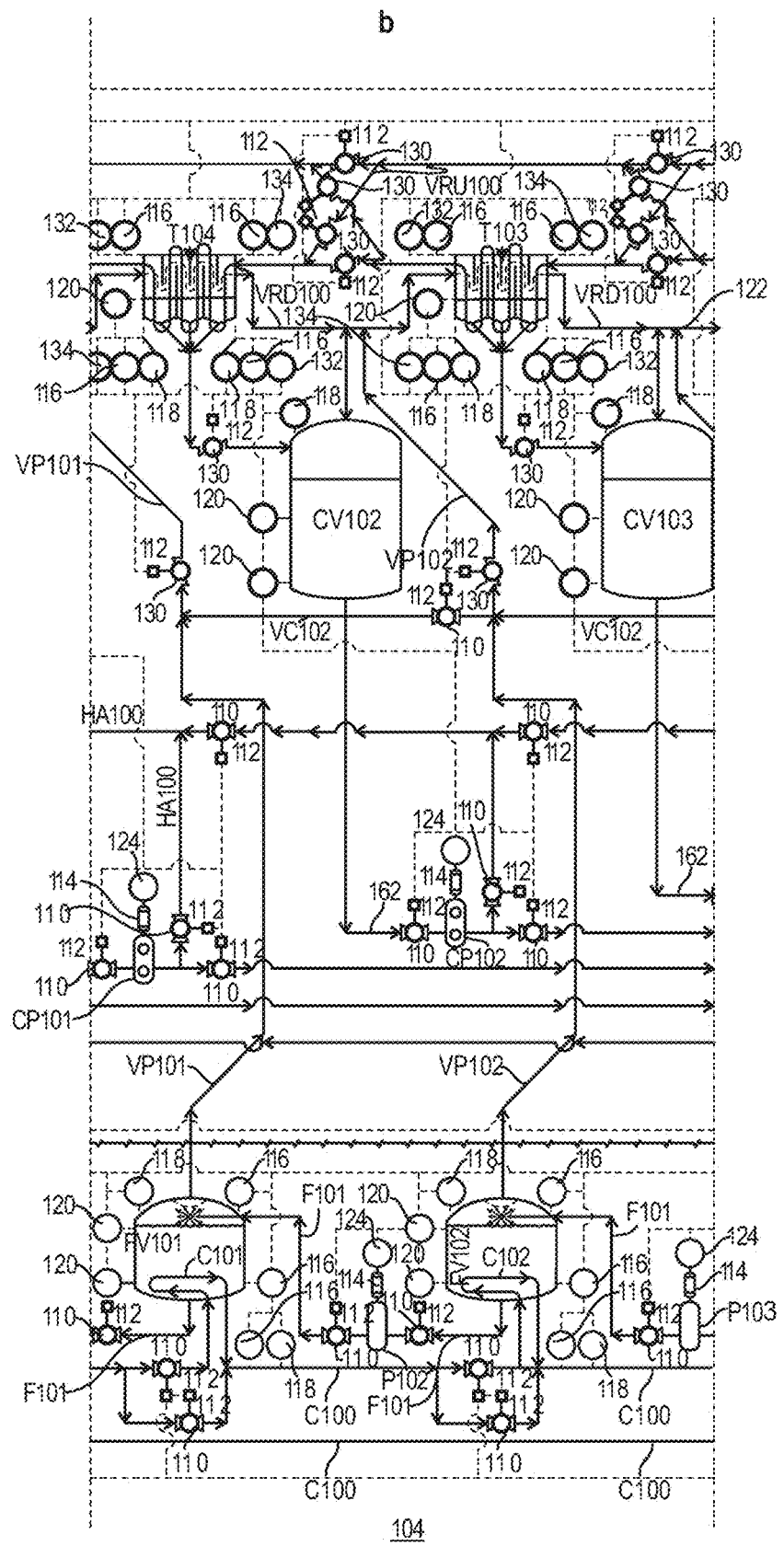

FIG. 1 depicts a schematic view of an example configuration of a system 100 to process feedstock with volatile components as described herein. Areas of FIG. 1 illustrate a thermal sink 102, a feedback preheat and pressure step down vapor flash system 104, and a thermal source 106. Sections a, b, and c are designated for FIG. 1, roughly corresponding to areas 102, 104, and 106, respectively, and each is also presented separately to facilitate reference to the designated elements. The example depicted is considered to be operating in a steady state processing mode. As shown in FIG. 1 and labeled in FIG. 1A, feedstock 108 enters/begins Binary Process Distillation (BPD) through Feedstock Piping F100, passes through motor-actuated valve 110 having an interface 112 that is in communication with a feedstock programmable automated controller (PAC) FC101. In various examples, motor-actuated valve 110 can represent different types of motor-actuated valves including a ball valve, a gate valve, etc., and interface 112 can effect positioning for the motor-actuated valve 110. The feedstock 108 passes into the Feedstock Pump P100 having an associated controller 114, which serves as an electronic interface to the mechanical pump P100. Several motor-actuated valves 110 with associated interfaces 112 are positioned along piping to the left of Feedstock Pump P100; together the motor-actuated valves 110 operate as a safety mechanism to maintain appropriate process integrity, flow, and pressure of feedstock 108. At least some of feedstock 108 passes through feedstock piping F101 into the Feedstock Vessel FV103. In the illustrated example, Feedstock Vessels FV103, FV102, and FV101 can have a plurality of associated transmitters including, temperature transmitter(s) 116, pressure transmitter(s) 118, and/or level transmitter(s) 120. In the illustrated example, Feedstock Vessels FV103, FV102, and FV101 are connected to respective Vent Piping VP103, VP102, and VP101, which will be discussed in greater detail below.

Figure 1C:
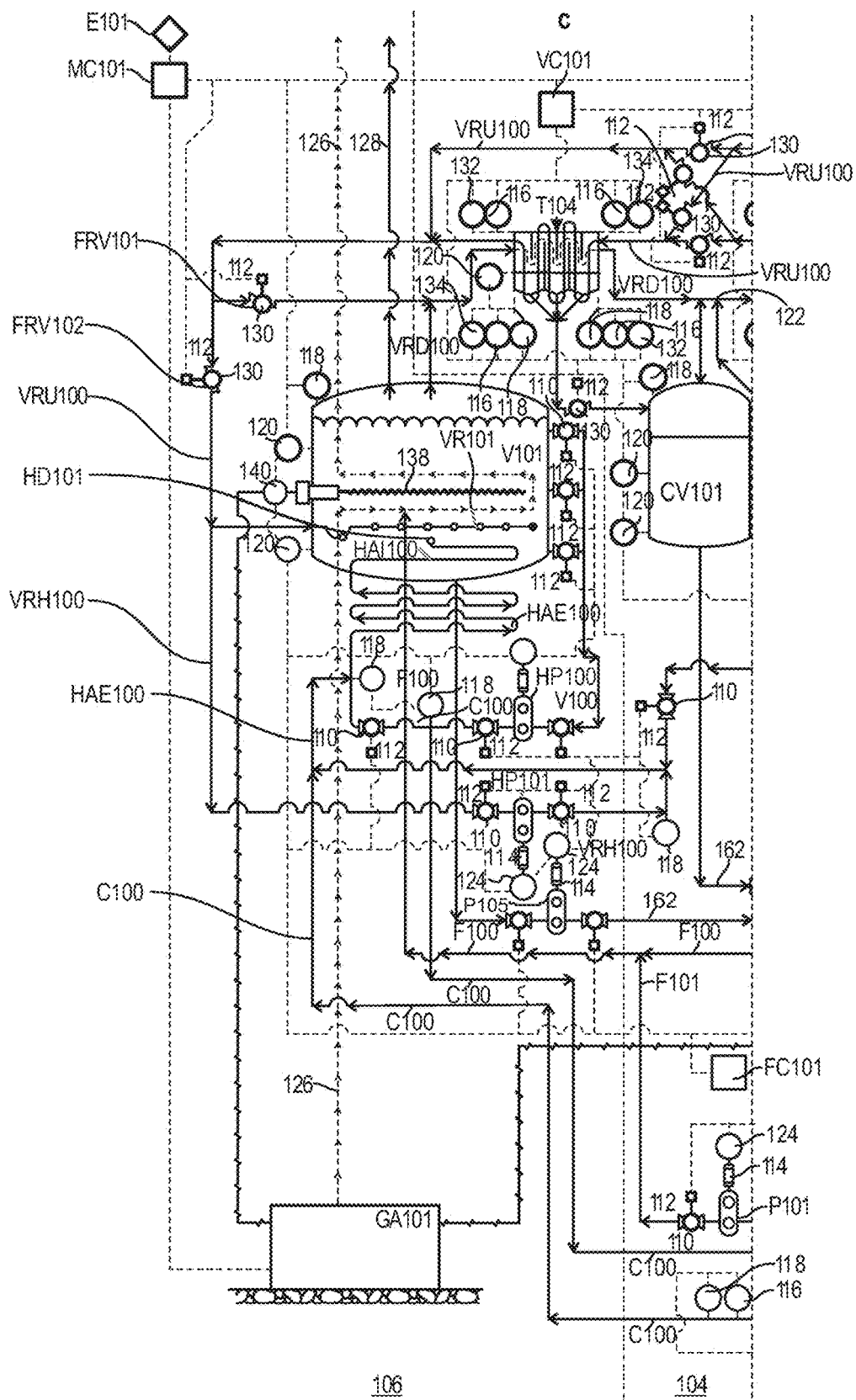

In some examples, Feedstock Pump P100 can be replaced by or act in parallel with a valve, a throttle, and/or an orifice, particularly when the feedstock contains particulate matter, which could otherwise damage pumps. Depending on the amount and type of entrained particulate matter, these particulate elements of the feedstock can be collected and removed from any of the Feedstock Vessels FV103, FV102, and/or FV101 as shown in FIG. 1, FIG. 1A, FIG. 1B, and FIG. 1C and/or the Conversion Vessel V101 as shown in FIG. 1C through the controlled use of pressure differentials across the valved and/or throttled "Blowdown Piping" (as shown in FIG. 3) associated with each vessel, and/or these particulate elements of the feedstock may be pumped out with particulate resistant pumps. When using pumps to transfer the feedstock, pressure can be either raised or lowered across Pump P100 to the desired pressure being controlled within the Feedback Closed Loop Vapor Transport System of FIG. 1 and primarily designated in FIG. 1B, at a venting point of entry 122, into the Feedback Closed Loop Vapor Transport System Piping VRD100, for example venting point of entry 122, between TIEs T103 and T104; this can facilitate direct venting from Feedstock Vessel FV103 via Vent Piping VP103 into this point of entry.

As thermal energy is transferred from the submerged Heat Transfer Coil C103, the incoming fresh feedstock 108 will begin to vaporize and vent its most volatile distillate components, which can be ducted through the Vent Piping VP103 up to that venting point of entry 122 between T103 and T104. Depending on temperature, pressure, and/or other parameters being used by the Programmable Automated Controller (PAC) MC101 to control positioning of the motor-actuated valve(s) 110 associated with Vent Piping VP103, the vaporized distillates can be directed into any of one, multiple, or all of the venting points of entry shown including between TIE T101 and TIE T102, between TIE T102 and TIE T103, and between TIE T103 and TIE T104. The remaining lightly heated liquid feedstock in Feedstock Vessel FV103 can then be passed through feedstock piping F101 and Pump P103, which has associated motor-actuated valve(s) 110 and a variable frequency device (motor speed controller) 124, while maintaining a constant stepdown pressure (this stepdown pressure delta could be positive, negative, or zero) into Feedstock Vessel FV102, where the process can be repeated, with additional thermal energy being added through the submerged Heat Transfer Coil C102, with the initial venting point of entry 122 now between TIE T102 and TIE T103, and with the submerged Heat Transfer Coil C102 piping temperatures being controlled by varying the heated flow volumes through Pump P104 into submerged Heat Transfer Coil C102, along with valve positioning, throughout the Feedback Preheat Coil Loop C100.

Note: The heat transfer fluid subsystem supplying thermal energy to the submerged Heat Transfer Coils C101, C102, and C103 including the Hybrid Phase Change Accelerated Vaporization Suction Piping V100, the Feedback Preheat Coil Loop C100, and Pump P104 may instead use a dedicated closed loop heat transfer fluid subsystem including a submerged heat transfer coil in the Conversion Vessel V101, an additional dedicated pump, and the same Feedback Preheat Coil Loop C100 routed to the submerged Heat Transfer Coils C101, C102, and C103 within the Feedstock Vessels FV101, FV102, and FV103. The remaining medium heated liquid feedstock in Feedstock Vessel FV102 can then be passed on through feedstock piping as previously discussed and through Pump P102 at constant stepdown pressure (this stepdown pressure delta could be positive, negative, or zero) into Feedstock Vessel FV101, where the process can essentially be repeated again. With the additional thermal energy being introduced through submerged Heat Transfer Coil C101, and the initial venting point of entry 122 being preferred as between TIE T101 and TIE T102, yet the vaporized distillates may still be directed into any of one, multiple, or all of the venting points of entry 122 shown, including between TIE T101 and TIE T102, between TIE T102 and TIE T103, and between TIE T103 and TIE T104, as in both prior instances. Though the figures illustrate Feedstock Vessels FV101, FV102, and FV103, it should be understood that a system including fewer or additional Feedstock Vessels is consistent with this disclosure.

In the illustrated example, the now preheated feedstock 108 can be passed through Pump P101 and feedstock piping F101. The preheated feedstock 108 from feedstock piping F101 can enter feedstock piping F100 to flow to a Conversion Vessel V101 and can be held at nearly constant pressure after Pump P101 so as to match the pressure within the Conversion Vessel V101. In the Conversion Vessel V101 preheated feedstock 108 is introduced to the gently heating mass of liquid distillates, residues, any contaminants, and diffuse gases being processed in the Conversion Vessel V101. Upon blending with the hotter liquids within the Conversion Vessel V101, the newly introduced feedstock 108 is also heated by heater element(s) 138 controlled by temperature controller 140, and many component distillates of the newly introduced feedstock 108 are soon vaporized. When using exhaust heating from an engine-generator, at least two vents to the atmosphere are associated with Conversion Vessel V101, an exhaust pipe 126, and an emergency vent 128. Residual produced in Conversion Vessel V101 can be transferred via piping 162 to onsite storage through pump P105 to be stored as residuum 152.

Without being limited to any particular theory, further vaporization, especially of the heavier component distillates, occurs when the returning "upstream" hot and dry carrier gases, along with any of the remaining lighter vaporized distillates, are delivered through the preheating Feedback Closed Loop Vapor Transport System Piping VRU100 and into the Vapor Return Manifold VR101 where they are passed into and blended with the liquids being processed in the Conversion Vessel V101. The preheating Feedback Closed Loop Vapor Transport System Piping VRU100 has a variety of associated throttled-check valves 130 to maintain one-way flow of the vaporized distillates. In Conversion Vessel V101 the hot and dry carrier gas bubbles become saturated with the heated and newly vaporized distillates, with the resulting expanding and combining bubbles rising to the surface and releasing their now saturated gases and vapors for transport through the post-heating Feedback Closed Loop Vapor Transport System Piping VRD100, and into a succession of TIEs T101, T102, T103, and T104, with each TIE being controlled and the saturated gases and vapors therein following a torturous path and held at successively lower enthalpies.

TIEs can have a plurality of associated transmitters including, temperature transmitter(s) 116, pressure transmitter(s) 118, level transmitter(s) 120, mass-flow transmitter(s) 132, and/or velocity transmitter(s) 134. Each of these TIEs can condense a specific range of vaporized distillates from the saturated gases and vapors, depending on the characteristic condensation temperatures and pressures. The TIEs can then isolate these condensed vaporized distillates as distinct condensate products to be collected within each of the associated Collection Vessels CV101, CV102, CV103, and CV104. Collection Vessels CV101, CV102, CV103, and CV104 can have a plurality of associated transmitters including, pressure transmitter(s) 118 and level transmitter(s) 120. From these Collection Vessels, each condensate product can be transferred via piping 162 to onsite storage through corresponding Condensate Pump CP101, CP102, CP103, and CP104 with an associated variable frequency device (motor speed controller) 124 and associated motor-actuated valve(s) 110 having an interface 112. The remaining flags, 148, 150, 152, 154, 156, 158, and 160 represent integration with onsite storage. For example, LNG 148 indicates produced LNG transferred to onsite storage: NGL 150 indicates produced NGL transferred to onsite storage: Residuum 152 indicates produced residual transferred to onsite storage; Condensate 154 indicates a first produced condensate transferred to onsite storage: Condensate 156 indicates a second produced condensate transferred to onsite storage: Condensate 158 indicates a third produced condensate transferred to onsite storage; and Condensate 160 indicates a fourth produced condensate transferred to onsite storage.

Any of the condensate products can be transferred using the corresponding Condensate Pumps and controlled valve positioning, into the Hybrid Phase Change Accelerated Vaporization Process Piping HA100. The Hybrid Phase Change Accelerated Vaporization Process Piping HA100 can be fed by any combination of gas(es) and/or liquid(s) streams including any of the condensate products held in Collection Vessels CV101, CV102, CV103, and/or CV104, the pressurized and chilled NGL liquids NGL101 from temperature controller 140 associated with Chiller Apparatus CA101, the highly pressurized cryogenic liquids LNG101 from vessel 142 associated with Chiller Apparatus CA101 and/or the lighter vaporized distillates and dried carrier gases returning to the Conversion Vessel V101 via the Feedback Closed Loop Vapor Transport System Hybrid Inlet Piping VRH100, and through the high pressure Wet Vapor Compressor Pump HP101 into the Hybrid Phase Change Accelerated Vaporization Process Piping HA100 for accelerated vaporization of the mid to very heavy distillates remaining present in the Conversion Vessel V101. In at least one example, this is true especially for those less volatile components, which would otherwise require greatly extended processing retention times and/or increased temperature ranges.

The main Programmable Automated Controller (PAC) MC101 can work in conjunction with other PAC in the system (any number may be used in total), including the Feedstock PAC FC101 and the Distillate Vapor PAC VC101. These PAC can work together to monitor systemwide temperatures, pressures, and/or mass flow rates: along with logging and storing these data to determine their interrelated integral and derivative optimums, inflections, and rates of change using artificial intelligence (AI) techniques combined with other industry standard practice. The Emergency Shutdown Device E101 is able to perform an immediate and safe process termination and system shutdown at any time one or more parameters reaches the edge of predefined normal operating limits. As the distillate components are vaporized and transported through the "downstream" network of Feedback Closed Loop Vapor Transport System Piping VRD100, a range of distillate vapors can be condensed in each of the successive TIEs T101, T102, T103, and T104, and deposited into each of the corresponding Collection Vessels CV101, CV102, CV103, and CV104. The carrier gases, and typically a range of the lightest and most volatile distillate vapors, are not condensed during this part of the vapor transport circuit, and so pass through to the Blower Apparatus B101, where pressure can be stepped up by a few pounds per square inch (psi). Velocity of the remaining cooled carrier gases and distillate vapors is controlled and maintained by the Blower Apparatus B101 to drive the overall Feedback Closed Loop Vapor Transport System. In this example, the Feedback Closed Loop Vapor Transport System Feedback Piping VRF100 connects into VRD100 after Conversion Vessel V101 and "upstream" of the TIE T101.

Figure 2:
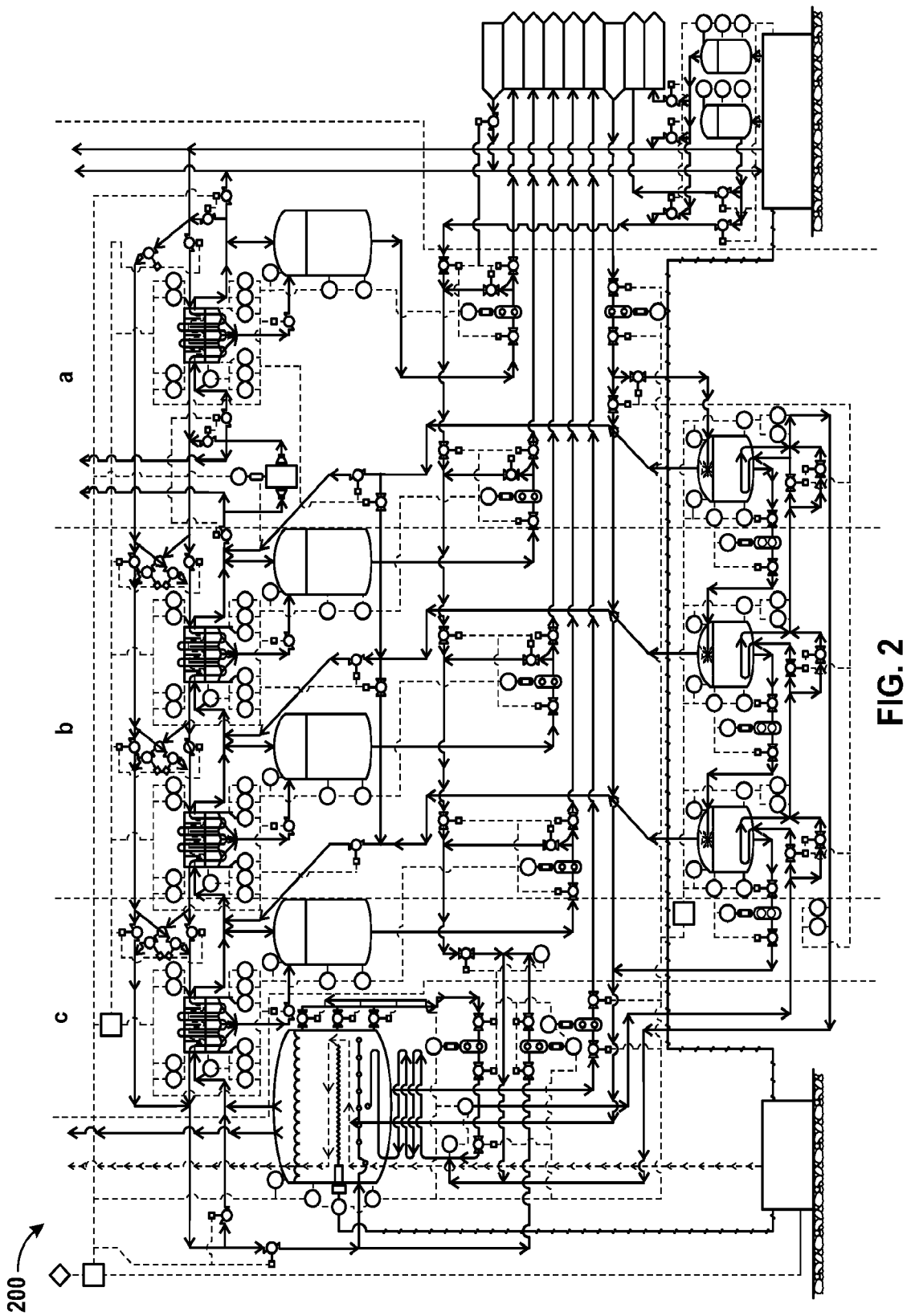
FIG. 2 illustrates an example processing system including features to process feedstock into light through heavy volatile components and volatile and/or non-volatile residue of arbitrary spec as described herein. Sections a, b, and c are designated for FIG. 2 and each is also presented separately as FIG. 2A, FIG. 2B, and FIG. 2C for ease of review.
Figure 2A:
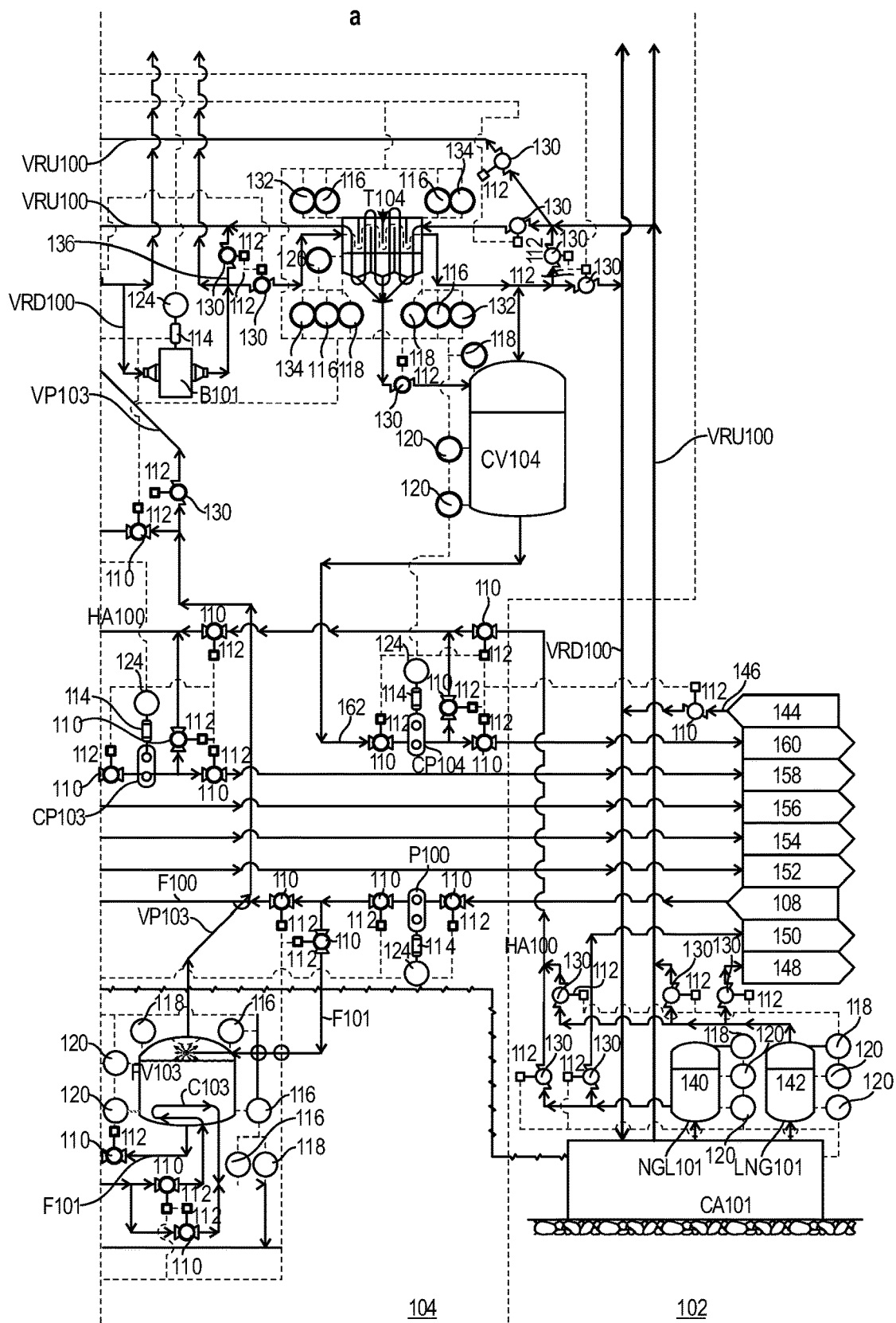
Figure 2B:
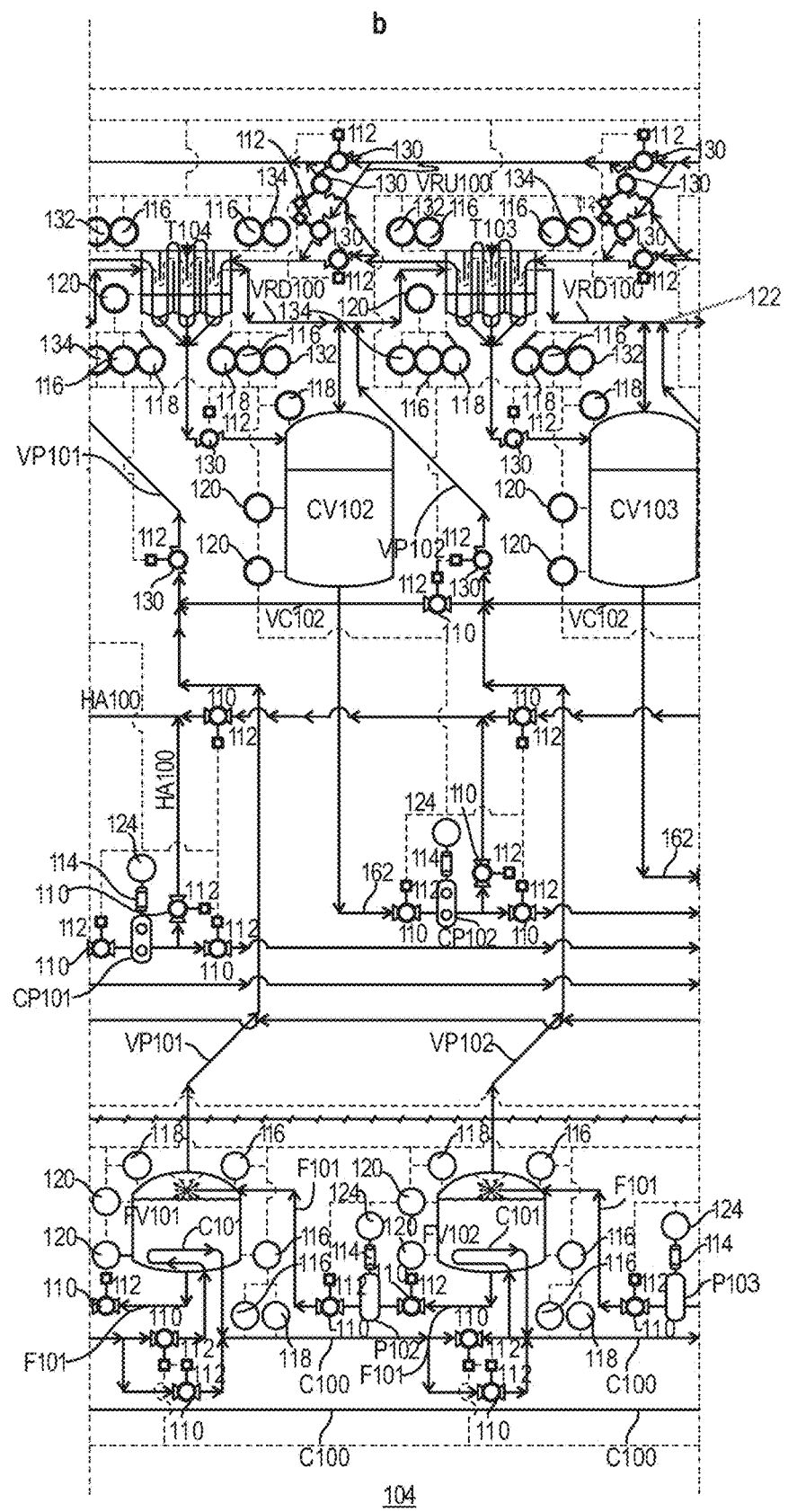
Figure 2C:
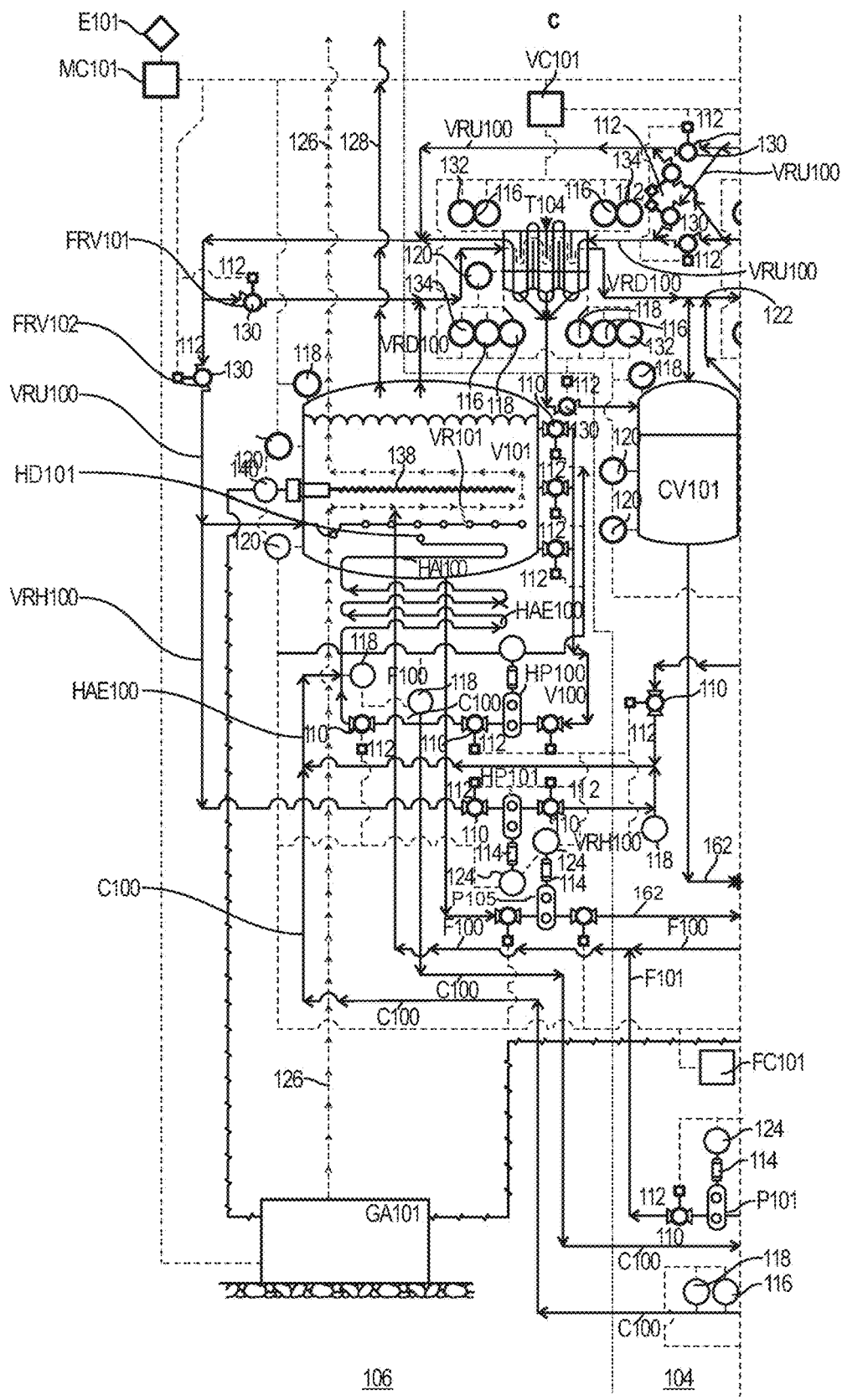

FIG. 2 depicts a schematic view of an example configuration of a system to process feedstock with volatile components 200 as described herein. Compared to FIG. 1, FIG. 2 illustrates an alternative location for the Blower Apparatus B101 between TIEs T103 and T104, or T102 and T103, for example; in both cases the alternative location can be "downstream" of the respective Vent Piping VP103 or VP102. This can allow for the "downstream" (from this alternatively located Blower Apparatus B101) insertion and operation of a Crossover Bridge Pipe 136 with associated throttled-check valves 130 (shown in FIG. 2) between the "downstream" VRD100 and "upstream" VRU100 sections of the Feedback Closed Loop Vapor Transport System Piping. Depending on feedstock and operating parameters, this would have multiple benefits including but not limited to maintaining a high flow "upstream" through the TIEs T101, T102, T103, and T104, along with a potentially higher "downstream flow", in order to maintain improved efficiencies while at the same time reducing flows of carrier gases and lighter vaporized distillates through the Chiller Apparatus CA101 which would allow colder temperatures to be reached and/or for more NGL NGL101 and LNG LNG101 liquids to be collected in their respective vessels. In the example of FIG. 2, the Feedback Closed Loop Vapor Transport System Feedback Piping VRF100 connects into VRD100 after Conversion Vessel V101. The described configuration can further enhance the reduced input energies required for the overall BPD, along with the closely associated and highly desired result of reducing carbon emissions due to reduced energy input requirements.

As shown in both FIG. 1 and FIG. 2, after the remaining cooled carrier gases and vaporized distillates have been propelled through the Blower Apparatus B101, the cooled carrier gases and vaporized distillates can be passed into the Chiller Apparatus CA101, where the cooled carrier gases can be further dried by condensing a portion of the remaining distillate vapors into the NGL NGL101 Vessel and the LNG LNG101 Vessel. After being further cooled, the dried carrier gases (and typically some portion of the remaining vaporized NGL and LNG distillates) can then begin their transport "upstream" through the network of Feedback Closed Loop Vapor Transport System Piping VRU100, and in turn can be selectively passed through (or bypass) the desired TIEs T101, T102, T103, and T104 where the carrier gases, and the desired remaining lighter vaporized distillates, are further dried through conductive heat transfer from the relatively heated "downstream" flow of carrier gases and vaporized distillates within the Feedback Closed Loop Vapor Transport System Piping VRD100 into the relatively cooled "upstream" flow of carrier gases and vaporized distillates within the Feedback Closed Loop Vapor Transport System Piping VRU100.

If the Chiller Apparatus CA101 is unable to provide sufficient quantities of cooled carrier gases to each of the TIEs, in order to process all of the heated and vaporized distillates proceeding from the Conversion Vessel V101, the carrier gases, as well as the desired remaining lighter vaporized distillates, can be diverted into the Feedback Closed Loop Vapor Transport System Feedback Piping VRF100, where they can once again be propelled through the succession of TIEs T101, T102, T103, and T104, and into the Blower Apparatus B101, further cooled in the Chiller Apparatus CA101, and then recycled back into the same Feedback Closed Loop Vapor Transport System Piping VRU100. This process can continue until the cooled carrier gases and distillate vapors have been sufficiently further cooled and dried such that the Feedback Regulating Valve FRV101 is then partially closed, and the Feedback Regulating Valve FRV102 is partially opened.

The partial closing of Feedback Regulating Valve FRV101 and opening of Feedback Regulating Valve FRV102 can be controlled so that a determinate volume of dried carrier gases and remaining light vaporized distillates (which have been subsequently heated after being passed through any, all, or none of the TIEs T101, T102, T103, and T104 after being cooled in the Chiller Apparatus CA101) can then be recycled back into the Conversion Vessel V101 through the Vapor Return Manifold VR101 (or recycled back into the Conversion Vessel V101 through the Feedback Closed Loop Vapor Transport System Hybrid Inlet Piping VRH100, which passes into the Hybrid Phase Change Accelerated Vaporization Process HA101 and through Process Piping HAE100 and HAI100), in order to displace an equal determinate volume of the heated and vaporized distillates being substantially simultaneously transported out of the Conversion Vessel V101 and into the "downstream" flow portions of the Feedback Closed Loop Vapor Transport System Piping VRD100. This process can allow the Blower Apparatus B101 to run at high speed giving high carrier gas and vapor transport velocities through each of the "upstream" partitions within each TIE T101, T102, T103, and T104, and the Chiller Apparatus CA101, and can reduce the velocities and/or quantities of heated and saturated carrier gases and vaporized distillates being delivered from the Conversion Vessel V101 into the Feedback Closed Loop Vapor Transport System Piping VRD100 and subsequent "downstream" partitions of each TIE T101, T102, T103, and/or T104. This resulting higher velocity of carrier gases and lighter remaining vaporized distillates in the Feedback Closed Loop Vapor Transport System Feedback Piping VRF100, VRD100, and VRU100 can reduce the thermal delta across heat transfer membranes within each of the TIEs T101, T102, T103, and T104 and the Chiller Apparatus CA101, which can raise the efficiencies of each TIE, the Chiller Apparatus, and the BPD itself.

FIG. 1 and FIG. 2 illustrate Hybrid Phase Change Accelerated Vaporization Process HA101 with external Process Piping HAE100, and internal Process Piping HAI100. In various examples, external Hybrid Phase Change Accelerated Vaporization Piping HAE100 can be fed from any or multiple sources including the Hybrid Phase Change Accelerated Vaporization Suction Piping V100 itself, which can connect the Conversion Vessel V101 through multiple substantially equally spaced radial and vertical ports (each port with a controlled Valve, not shown) into the Pump HP100, the Collection Vessel Recycle Piping HA100, which transfers condensate products through Pumps CP101, CP102, CP103, and CP104 either out of the BPD to onsite storage, or back into the Hybrid Phase Change Accelerated Vaporization Process HA101 itself through the Collection Vessel Recycle Piping HA100, or the Feedback Preheat & Pressure Step Down Vapor Flash System Piping C100.

An example mode of operation is to combine any or all of the feed streams, including a feed stream from the Hybrid Phase Change Accelerated Vaporization Suction Piping V100, a feed stream from the greatly cooled Feedback Preheat & Pressure Step Down Vapor Flash System Piping C100, along with a feed stream being supplied by any of the various cooled condensate products available through the Collection Vessel Recycle Piping HA100. The resulting relatively cooled blend can be highly pressurized within the external HAE100 piping in order to provide an accelerated (i.e., reduced) material contact retention or dwell requirement. Without being restricted to any particular theory, once this cooled blend has passed through the external HAE100 piping, the cooled blend is subsequently heated within the coils of the internal HAI100 piping, which results in explosive vaporization of the heated blend (including the heavier processed liquid feedstock residue with the lighter condensate products, with these lighter products having been selected for their ability to rapidly diffuse into the heavier residue molecules, which loosens and releases the light through middle to heavier distillates still remaining with or "stuck to" those residue molecules) through the Hybrid Phase Change Accelerated Vaporization Process Orifice Nozzle/Diffuser HD101 located at the terminus of the Hybrid Phase Change Accelerated Vaporization Process Piping HAI100 within the Conversion Vessel V101.

The terminus of the Hybrid Phase Change Accelerated Vaporization Process Piping HAI100 can contain a controlled Valve (not shown), and this controlled Valve can be integral to or associated with the Hybrid Phase Change Accelerated Vaporization Process Orifice Nozzle/Diffuser HD101 itself, or divert past the Hybrid Phase Change Accelerated Vaporization Process Orifice Nozzle/Diffuser HD101 altogether (the Valve is used to control pressures within the Hybrid Phase Change Accelerated Vaporization Process Piping HAI100 and HAE100). The lighter and middle weight distillates can then be released into the heated liquid mass of processed feedstock residue within the Conversion Vessel V101 and can be subsequently vaporized, transported downstream, condensed, and deposited into their respective Collection Vessels CV101, CV102, CV103, or CV104 as value-add condensate products. In addition to the three feed streams described above, the Hybrid Phase Change Accelerated Vaporization Process HA101 can be fed by a fourth feed stream, including the returning heated carrier gases and remaining vaporized lighter distillates flowing "upstream" through the Feedback Closed Loop Vapor Transport System Piping VRU100, a portion of which can be diverted through the Feedback Closed Loop Vapor Transport System Hybrid Inlet Piping VRH100 into the high pressure Wet Vapor Compressor Pump HP101. This fourth feed stream can provide lighter weight gases and vaporized distillates directly into the Hybrid Phase Change Accelerated Vaporization Process HA101, which can be especially effective when the Hybrid Phase Change Accelerated Vaporization Process is being run at reduced pressures, and with certain processed feedstock residues. Throughout the BPD, the PAC MC101 can monitor and optimize production rates by balancing availability of electrical power from the Generator Apparatus GA101 with the Chiller Apparatus CA101: the internal electrical and exhaust gas heating within the Conversion Vessel V101, along with monitoring the processed feedstock residue density, closed loop thermal and mass flow parameters including temperatures, pressures, condensate specifications, and product collection rates, among others.

Description of Operation

In the BPD with integral Feedback Closed Loop Vapor Transport System described herein, for example, an onboard diesel engine-generator GA101 can produce electricity for the heater element(s) 138 associated with the Conversion Vessel V101, and also provide electricity to one or more electric motors which can drive the vapor transport blower device(s) B101, and/or compressor pumps and/or fans associated with the Chiller apparatus CA101. Any or all of these mechanical apparatus can instead be driven by one or more hydraulic motors, or directly coupled though clutched transmissions with gearing, or through fluid coupling, etc. The Generator GA101 also has an exhaust pipe 126 which enters the Conversion Vessel V101 below the liquid level which coils around inside and transfers heat to the surrounding liquid feedstock, and then the cooled exhaust exits and is returned to the atmosphere. The exhaust pipe 126 provides an excellent thermal source in this example, and is used as the primary source of energy input into the relatively "higher temperature" side of the BPD in which electricity from the engine generator GA101 can drive variable frequency drive motors inside the Chiller CA101 apparatus, for example, to power the relatively "lower temperature" heat sink side of the BPD. The Integral Feedback Closed Loop Vapor Transport System connecting the Conversion Vessel V101 with the Collection Vessels CV101, CV102, CV103, CV104, and the intermediate TIEs T101, T102, T103, T104 provides an intelligent network, which can conserve energy while optimizing production of condensate products from the vaporized feedstock distillates entrained along with the carrier gases within the interconnected piping, the condensate products therein being precisely condensed, isolated, and collected within each Collection Vessel for removal, and/or further processing (either on or off the skid).

In various examples, electricity generated by an onboard diesel engine-generator as shown in FIG. 3 (Modular Unit Refinery) is by definition finite. In examples, the generated electricity must be allocated across the heating element(s), the Chiller, and/or the Blower while also providing electricity to power the PAC, the networked instrumentation, and the valves that control vapor transport routing through pipe network. Allocation of this electrical power can depend on a number of factors including one or more of heating performance, Chiller performance, Blower performance, initial temperature of the feedstock prior to entry into the Conversion Vessel, volatility of the feedstock distillates, and/or the ratios and requirements of the condensate and residue products desired, among other factors. The system's electrical balance can largely determine production outcomes for any given feedstock, and can be completely controlled by the PAC.

Chilling performance may be a limiting factor for the self-contained skid mounted Modular Unit Refinery when configured with the onboard engine-generator, as contrasted with connecting directly to the electrical grid, because the Modular Unit Refinery will generally be able to provide more exhaust pipe thermal capacity than electromechanical chilling capacity, except potentially when using startup carrier gas 144 carried by carrier gas piping 146 during transient cold startup operations. The excess thermal heating capacity can be used to drive other industrial thermally dependent processes in the local area, and/or to help keep the feedstock tanks warm and flowing, especially in a cold environment. In at least one example, if the feedstock is a blend of hydrocarbons with relatively lighter and more volatile distillates, or largely consisting of water or other materials with relatively higher vaporization pressures, the self-contained skid mounted Modular Unit Refinery can provide an excess of engine generator derived electricity. In this example, other electrically dependent processes in the local area can benefit from this potentially reserve capacity for electrical generation, with the engineered balance largely determining production outcomes for any given feedstock in either industrial or residential applications, or to keep the feedstock tanks warm and flowing. These inter-related factors and alternative reserve energy options are dependent on feedstock characteristics.

In examples predicated around a self-contained skid mounted package, which could also be designated as a Modular Unit Refinery (see FIG. 3), the various component equipment, piping, and storage apparatus can be sized and rated to provide reliable continuous production, with the total electrical loads generally balanced against the rated output of the diesel genset, such that maximum diesel exhaust gas temperatures can hover below 1,200 F (or below the maximum temperature rating for extended operations of the internal combustion engine being used). With the diesel genset running at its optimum controlled parameters for fuel delivery, rpm, and exhaust temperature, there is a spread between the temperature of the liquid feedstock material being processed and vaporized in the Conversion Vessel, and the approximately sub 1,200 F maximum rated diesel engine exhaust gas temperature. This temperature differential can provide for significant thermal input in the form of British Thermal Units (BTUs) to the Conversion Vessel, which can help to drive the Closed Loop Thermal portion of the process. Higher temperatures can be obtained using alternative types of internal combustion engines such as a gas turbine, or complete methane combustion, although the disclosed configuration is limited to these types. Higher temperatures can increase overall efficiency of the Modular Unit Refinery. Flexibility of a diesel genset to provide its own load while generating both heat and electricity, the ability to run efficiently at varying load settings, and quick start ability, can make a diesel genset a good primary energy source for many applications because of its combination of standalone performance capabilities along with affordability, general economy, and good reliability.

Expanding on the description of the Modular Unit Refinery as described in the examples above, the excess thermal energy contained in the diesel genset exhaust can be used to supplement a variety of power installations. For example, a Modular Unit Refinery can supplement a solar or wind power installation, which can store excess thermal energy, for example within molten salt beds, which will become increasingly associated with wind and solar power installations in the future, to provide either a buffer energy source or other reserve capacity for high load demands and during darkness or periods of no wind. The Modular Unit Refinery can be included with installations of this type, as the thermal energy stored within the shared molten salt beds can be used to heat steam which can be used to drive turbines to produce electrical power for use back on the Modular Unit Refinery itself for chilling or other purposes, as well as supplied back into the nationwide electrical utility grid.

Hybrid Phase Change Accelerated Vaporization Process

The desired residue specification (spec) can be achieved through intelligent balancing and optimization of one or more of a number of parameters made available through the use of the disclosed BPD with integral Feedback Closed Loop Vapor Transport System. These parameters can include the temperatures and densities of the liquid feedstock within the Conversion Vessel at different levels, the temperature and pressure being maintained in the vapor chamber above the liquid feedstock materials, the temperature, pressure, velocity, and density of the vaporized feedstock distillates at each stage in the successive "downstream" interconnected vapor transport piping between each TIE and through each Collection Vessel, the pressure and temperature of the coldest point within the Feedback Closed Loop Vapor Transport System adjacent to the Chiller, and/or the temperature, pressure, velocity, and density of the remaining vaporized feedstock distillates and dried carrier gases at each stage in the successive "upstream" interconnected vapor transport piping between each TIE as the vapor mass flow is returned to the heated Conversion Vessel, and for partial recycle through the disclosed Hybrid Phase Change Accelerated Vaporization Process coils.

While it may be possible to achieve an arbitrary residue specification in the Conversion Vessel by lowering pressures and increasing temperatures sufficiently using a typical straight sparging step to remove the lighter distillate components, it becomes readily apparent that production rates of the heavier condensate products drop off considerably once pressure is held below a certain evacuation threshold. Mass transport in evacuated piping, even with velocities approaching sonic levels, simply does not allow for acceptable spec residue production levels. The other solution using only a straight sparging step, is to raise temperatures sufficiently to force production back into acceptable levels, but this adds greatly to the thermal inputs required, increases environmentally harmful emissions, increases reactivity of the volatile feedstock distillates and other non-volatile components, and decreases reliability, which are all highly undesirable process characteristics to those skilled in the art. The disclosed Hybrid Phase Change Accelerated Vaporization Process avoids all of these negative process dilemmas and may be incorporated within the natural layout and normal temperatures associated with the disclosed configuration for a BPD with integral Feedback Closed Loop Vapor Transport System.

The Hybrid Phase Change Accelerated Vaporization apparatus includes an external high-pressure pump which can draw the heated liquid feedstock from multiple substantially equally spaced sidewall locations within the range of liquid levels inside of the Conversion Vessel into a pipe through a controlled valves and/or a restrictive hole(s) sufficient to create a pressure differential across said hole(s) sufficient to move the desired amount of the liquid feedstock into the piping at desired locations along the sidewall of the Conversion vessel, depending on factors such as liquid feedstock viscosity, temperature, and liquid feedstock volatility, among other factors. The high-pressure pump can subsequently pressurize said liquid through said pipe. The liquid can then pass back into the lowest volumes of the Conversion Vessel where it can be passed through a length of coiled piping and then exited back into the heated feedstock liquid being processed in the Conversion Vessel through a controlled valve/restrictor orifice/diffuser. This restriction can build and maintain pressure within the length of coiled piping and can allow a fraction of the returning lighter condensate products or diverted feedback dried carrier gas to make contact with and diffuse into the larger and heavier feedstock molecules over the length of time required for a given unit of the liquid to pass through the length of the coiled piping before being returned to the main body of liquid in the Conversion Vessel. The greater the length of the submerged coil, the more effectively the disclosed Hybrid Phase Change Accelerated Vaporization Process will progress, primarily because of phenomena associated with material contact retention and dwell time.

Because a controlled fraction of the returning dried carrier gas and the remaining noncondensed distillate product vapors can be allowed to bleed into the reduced pressure suction pipe into the high-pressure pump, these liquid and gaseous components can be blended and make contact with a portion of the heaviest molecules within the feedstock. Without being restricted to any particular theory, this can cause the lightest dried carrier gases to embed and diffuse into these heavy molecules and can cause the middle weight molecules embedded within the heavier molecules to be expelled in similar fashion, with ratios of these light vs middle weight molecules being governed by standard rules involving partial pressure fractions. Notably, the heavier that the light or middleweight molecules are that are embedded into the heaviest molecules, the more time is required for them to diffuse out when being displaced by the lighter returning condensate product molecules and the lightest dried carrier gas molecules, which can be being allowed to diffuse in. The Hybrid Phase Change Accelerated Vaporization Process can rapidly begin when the highly pressurized, subsequently heated, and heaviest molecules within the submerged coils can be released into the lower liquid pressures within the lower parts of the Conversion Vessel, and the newly diffused lighter components, along with the previously embedded middle weight molecules can be flashed out as bubbles of partially saturated vapor, where they can rise through the surface and become the vaporized distillates within the saturated carrier gases being transported through the Feedback Closed Loop Vapor Transport System for individual recovery and isolation of their condensate products.

Those skilled in the art will also realize that further potential exists within the Hybrid Phase Change Accelerated Vaporization Process by understanding that the ratios of returning uncondensed middle weight distillate molecules will have a great influence on reaching high spec residue production rates if the temperature within the submerged coils is too high to permit condensation of the dried carrier gas, for example, even under the higher pressures which exist within those pressurized coils. In that example, the middle weight molecules can serve the diffusion function, and can flash to saturated vapor bubbles when re-introduced back into the lower pressure but higher temperature Conversion Vessel environment, with contact dwell time still playing an important factor. In at least one example, as the lighter distillate components are physically removed from their connection to the heaviest, longest, and most entwined feedstock molecules, these heaviest molecules are slowly drawn into each other, with this mass of remaining feedstock molecules becoming more dense, and they slowly migrate to the bottom of the Conversion Vessel where they can, under controlled conditions, be removed as a high-quality spec residue. Thus, while employing the Hybrid Phase Change Accelerated Vaporization Process when targeting a valuable and high spec residue, higher temperatures may not always provide increased processing capacity. This is contrary to earlier known processes which are limited to straight sparging techniques. For nominal production capacity of the overall BPD, the high-pressure pump driving the Hybrid Phase Change Accelerated Vaporization Process can be sized to move a volume of liquid about equal to the interior volume of the Conversion Vessel in a predetermined amount of time, e.g., 30 to 60 minutes.

Example Modular Unit Refinery Operating Control Parameters

In the following examples, an interconnected network of TIEs can monitor mass flow rates of the vaporized feedstock distillates passing out of the heated Conversion Vessel at successive points along the Feedstock Closed Loop Vapor Transport System. The interconnected network of TIEs can monitor the ratio of condensate products being produced and isolated in the Collection Vessels, for example recording operational progression of these parameters over time as the process moves through one stable operational phase to the next. PAC control parameters can shift from one optimization profile for each operational phase to the next as different limiting parameters within the BPD become dominant during different phases of the operational cycle, for example, when feedstock streams with variable characteristics are being introduced. In at least one example, the ability of PAC control parameters to shift from one optimization profile for each operational phase to the next as different limiting parameters within the BPD become dominant during different phases of the operational cycle enables a Modular Unit Refinery to exhibit reliable operational control when dealing with transient startup periods and/or variable feedstock specifications while maintaining strict condensate product requirements and quality standards during all phases of operation BPD.

In various examples, new light feedstock can be introduced into the Conversion Vessel while being heated from ambient storage temperatures. When using this "volatile feedstock" during a startup or early in a production phase, the governing parameter will likely be the Chiller capacity, since production rates will be very high, and chiller requirements will be pushed to the max. In this example, the vapor transport speed out of the Conversion Vessel can be reduced to prevent condensate product streams from being "pushed" into successively "colder" specified Condensation Vessels, as chiller capacity for that condensate product becomes "swamped", or "over-reaches its maximum limit". Slower gas vapor velocities out of the Conversion Vessel, along with associated lower mass transfer rates, can allow the Chiller, running at substantially 100% of capacity, to keep up. This is true even when the Feedback Closed Loop Vapor Transport System is running a large portion of the "upstream" carrier gases and vaporized distillates, which would normally be returned into the Conversion Vessel through the Vapor Return Manifold, into the Feedback Closed Loop Vapor Transport System Feedback Piping for return through the Blower Apparatus to the Chiller Apparatus for further cooling. Thus, slower speeds for the Blower Apparatus are not typically associated with this situation.

In some examples, during a phase well into the processing of a batch of heavy feedstock, it can be determined that the remainder of the residue in the Conversion Vessel will be required to meet a certain regulated and strict product specification. In this example, it is likely that the Blower speed will be the limiting factor and that throttling back the Chiller and/or the Heat input may be in order. With maximum rated Process temperature being easily achieved near the end of a batch run to create heavy spec bitumen products, the next factor to monitor and optimize can include balancing Condensation Vessel temperatures against a Blower speed reaching the maximum rated speed. The connecting network of TIEs can monitor the mass flow rates out of the "hot" Conversion Vessel, as well as the fractional condensate product ratios into each of the successively cooled Condensation Vessels. In this example, the monitoring will be during the final phases of a rapidly changing batch termination phase. Both Conversion Vessel Liquid Temperature and Blower speed will be substantially at a maximum, with Heat and Chiller capacities balanced to maintain temperatures, and pressure regulated to maximize production rates. In this example, if the pressure is too high, the system will suppress production of heavy distillate vapors, and if the pressure is too low, vapor mass transport will be insufficient to maintain required production rates, and the system will suppress production. A component of the total Modular Unit Refinery Package is a Programmable Automation Control computer. A Programmable Automation Control computer can use AI to recognize important control parameters and process sensitivities, as well as to develop strategies to optimize these factors in real time, whether in research settings or commercial applications.

Thermal and Dynamic Flow Control of Closed-Loop Processes

In various examples, it is important to control pressures, during one or more aspects of processing, from about 1 mTorr up to about 2,585 m Torr (or ~0 to 50 psia) (Higher pressures of at minimum about 700 psia may be available within the Chiller apparatus itself in order to obtain the NGL and LNG products associated with the pressure regulating functions within the Feedback Closed Loop Vapor Transport System), so that the BPD is able to easily target a high production rate for a volatile feedstock, for example, while later being able to target a difficult residue spec for a heavy feedstock. This pressure regulation function can work in a complimentary manner alongside the Feedback Preheat and Pressure Step Down Vapor Flash System, the Feedback Closed Loop Vapor Transport System, and/or the Hybrid Phase Change Accelerated Vaporization Process.

In at least one example, adding feedstock during processing can achieve maintenance of a stable operating level within the Conversion Vessel, which can also increase the production of the more volatile condensate products due to their relatively higher vapor pressures, as well as overall production quantities. This can also increase the overall pressure on a system basis, which can make it more difficult to vaporize the heaviest feedstock distillate components without flooding the TIEs and losing condensate product specifications. The factors involved in this case can be important for reaching the most difficult heavy residue specs, for example achieving performance grade (PG) Grade 64 liquid asphalt. The most difficult classes of heavy residue specs may only be achieved after the required fractions of every feedstock distillate has been vaporized, transferred "downstream," and isolated as distinct condensate products in the successive Collection Vessels; this includes especially the heaviest feedstock distillates. Depending on the feedstock involved, this may optimally be achieved with a batch processing strategy using variable temperature and pressure techniques.

Modular Unit Refinery

FIG. 3 generally illustrate perspective views of an example processing system 300 having modular components including features to process feedstock into light through heavy components and non-volatile residue as described herein. In at least one example, the system of the present disclosure can be constructed as a self-contained skid mounted modular package configuration, in which one or more modular units (each of which can include a complete and completely self-contained Modular Unit Refinery 300) can be transported to an installation site and connected for operation. Multiples of these Modular Unit Refineries 300 may be connected together to create large or very large Modular Unit Refinery Plants in order to scale up refining capacity, or individual Modular Unit Refineries 300 may be disconnected from an existing Modular Unit Refinery Plant to scale down production capacity. In examples, individual Modular Unit Refineries 300 may be swapped in or out as desired to make upgrades or repairs.

In examples, individual Modular Unit Refinery packages 300 may be added or subtracted from existing installation sites without disrupting ongoing production operations. Modular Unit Refineries 300 can be transported to and from virtually any location (including, without limitation, onshore and offshore sites with limited access and/or operations, and/or lack of refining capacity). Likewise, Modular Unit Refineries 300 can be built quickly and efficiently and can be connected together in either serial layouts (for a greater range of condensate and residue products), or in parallel layouts (for increased production capacity and redundancy), or a combination of the two. Process parameters of a Modular Unit Refinery 300 can be controlled automatically with Programmable Automated Controllers (PACs), and the Modular Unit Refinery does not require electricity, water, or any utility infrastructure to support its normal operations. A Modular Unit Refinery 300, when processing typical hydrocarbon feedstocks, is able to create its own condensate products for use as fuel by its onboard diesel or LNG engine-generator to comply with fuel and emissions specifications, which are often regulated by local jurisdictions.

Figure 3A:
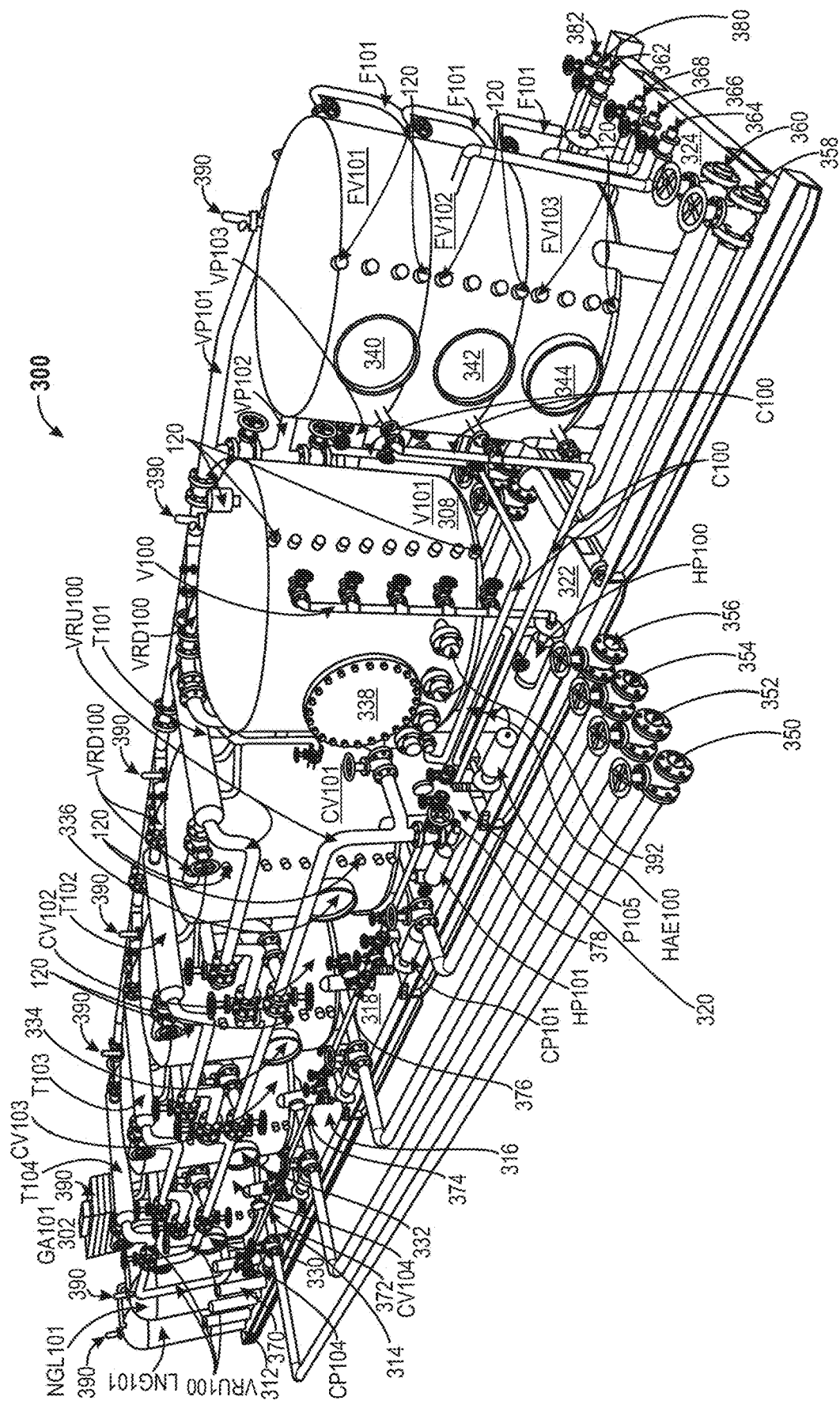
FIG. 3A, FIG. 3B, FIG. 3C, and FIG. 3D illustrates perspective views of an example processing system having modular components including features to process feedstock into light through heavy volatile components and volatile and/or non-volatile residue of arbitrary spec as described herein.
Figure 3B:
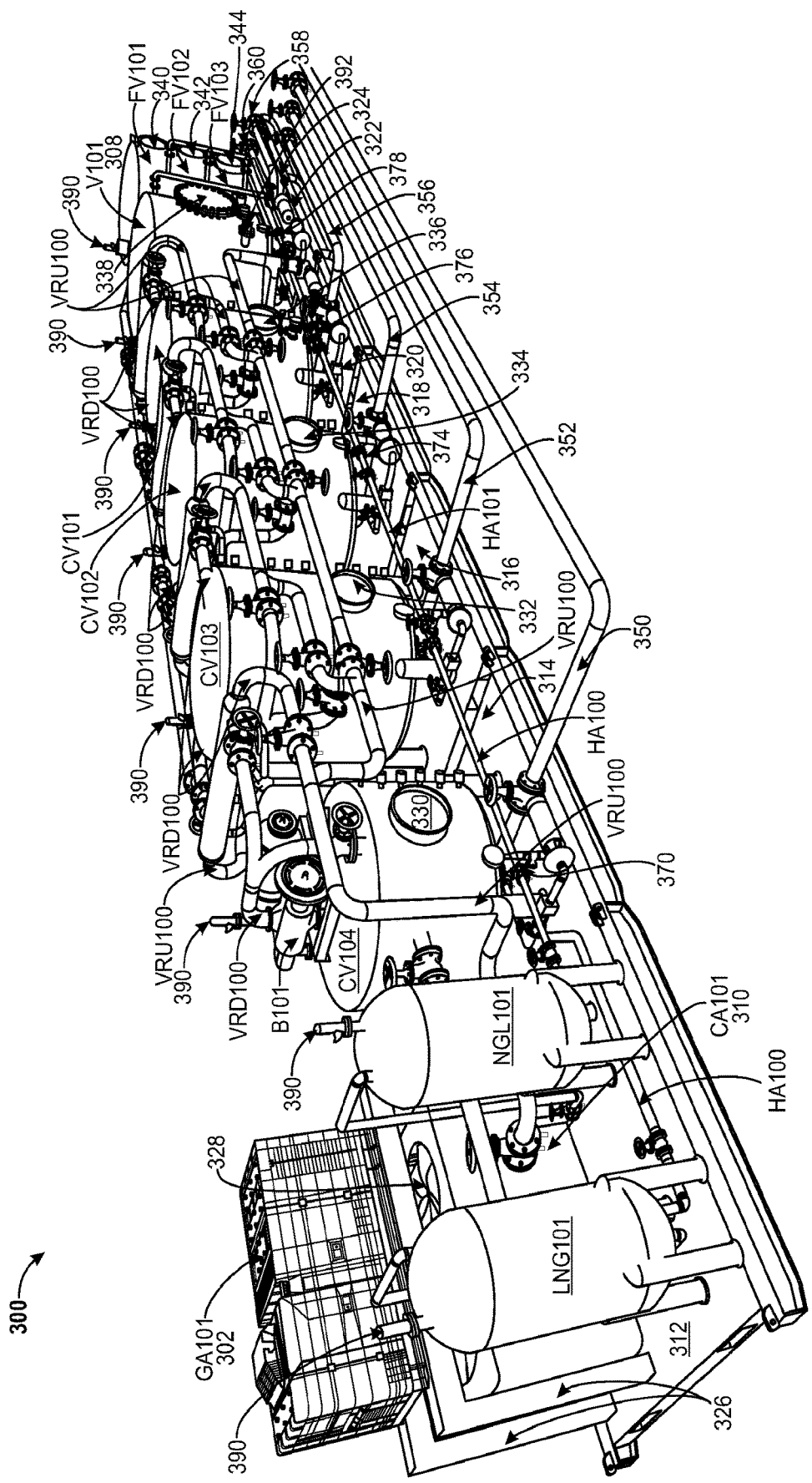
Figure 3C:
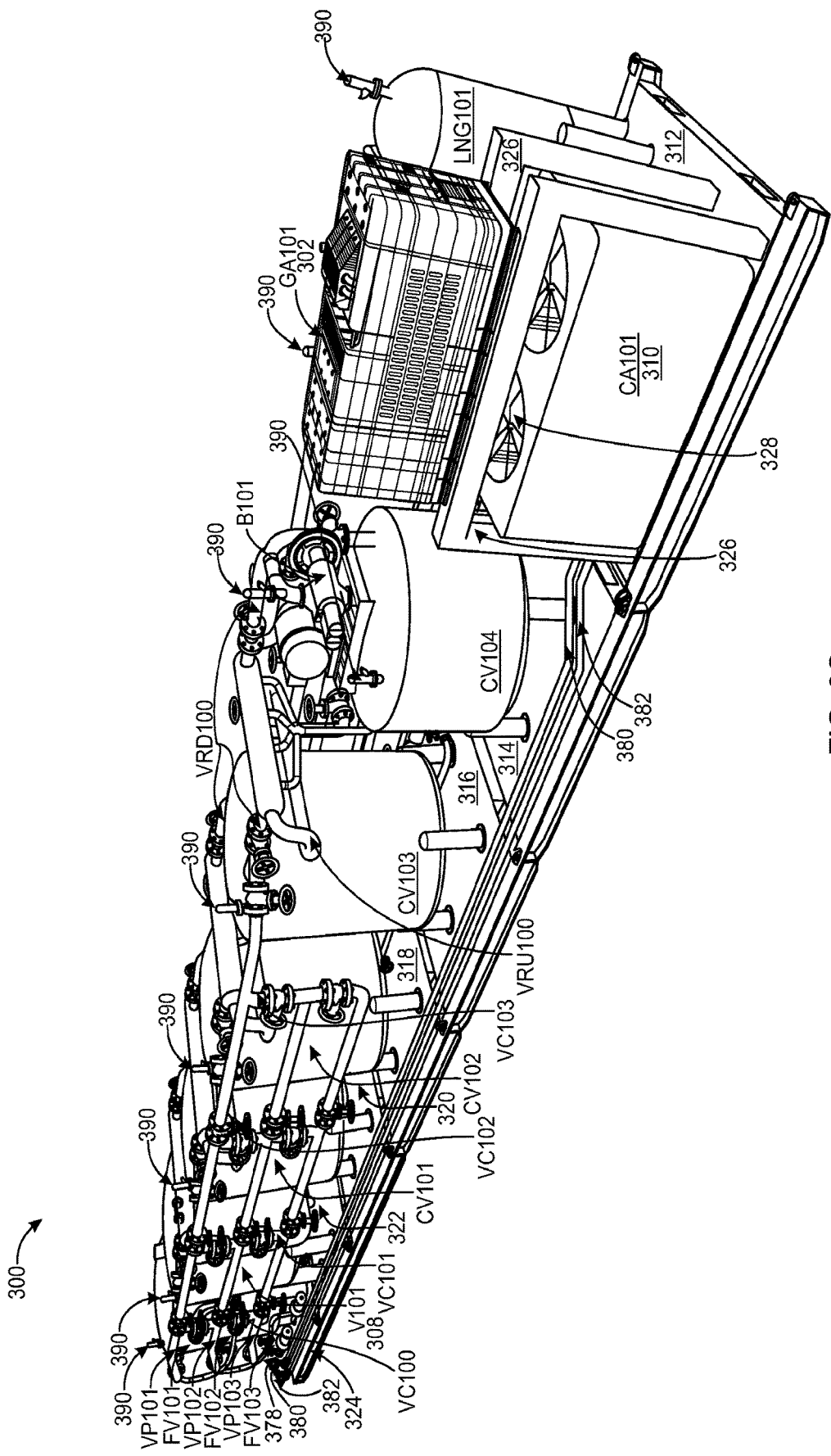
Figure 3D:
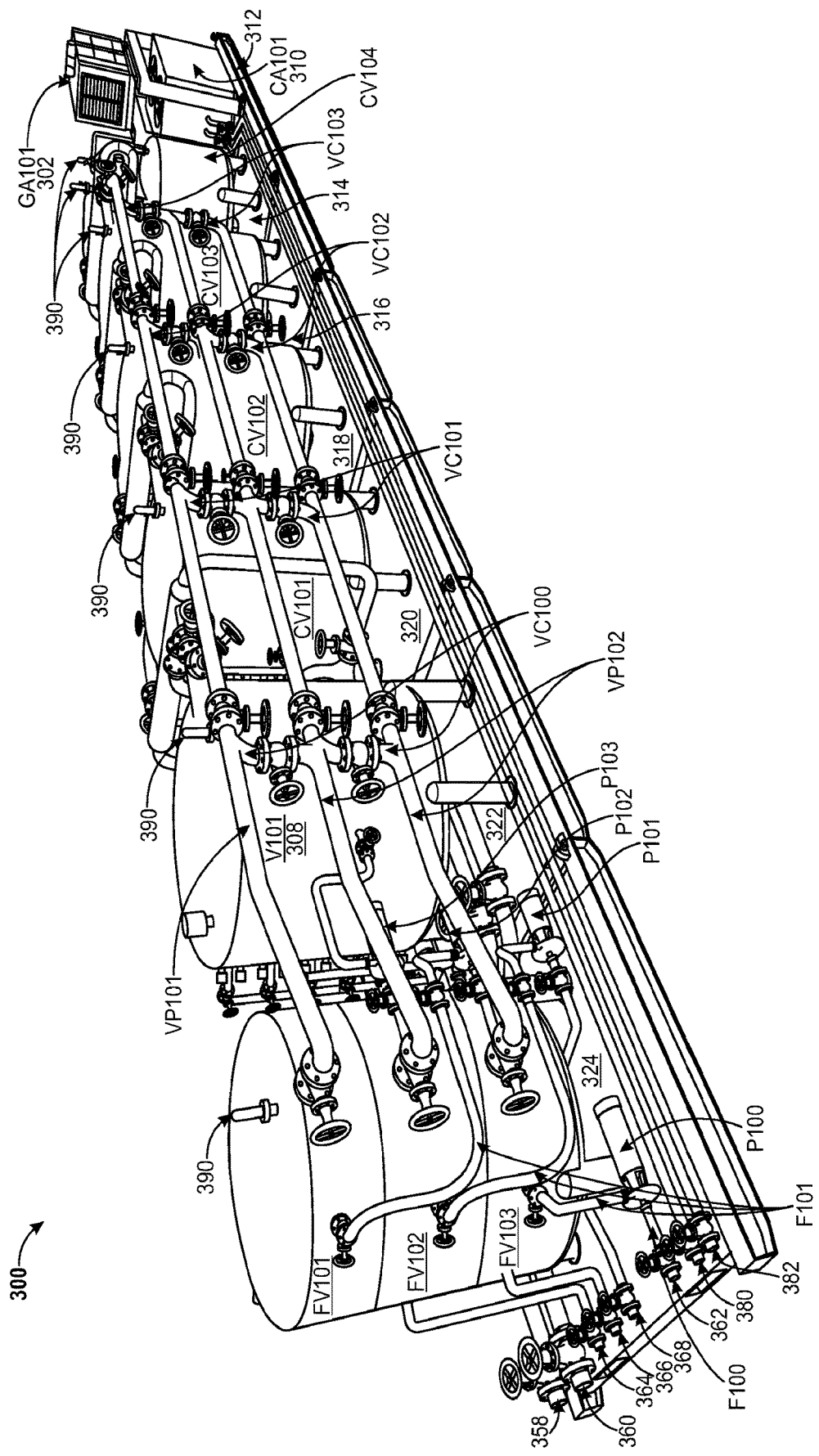

FIG. 3A, FIG. 3B, FIG. 3C, and FIG. 3D illustrate perspective views of an example processing system (Modular Unit Refinery) 300 having modular components including features to process feedstock into light through heavy components and non-volatile residue as described herein. FIG. 3A is from a right-front perspective: FIG. 3B is from a left-front perspective: FIG. 3C is from a left-back perspective; and FIG. 3D is from a right-back perspective.

Some examples of the processing system 300 shown in FIG. 3A, FIG. 3B, FIG. 3C, and FIG. 3D can be sized and/or configured to allow packaging for transport and/or deployment inside a standard high-cube 53' shipping container. The example FIG. 3A, FIG. 3B, FIG. 3C, and FIG. 3D illustrate represents a single standalone Modular Unit Refinery application. This example includes a self-contained skid mounted diesel generator package 302, GA 101 and includes a plurality of skids with respective components mounted thereon.

In the example processing system 300, as shown in the perspective view of FIG. 3A, an exhaust pipe 126 (not shown), associated with GA101, e.g., molten salt source, grid-source, self-contained skid mounted diesel generator package 302, GA101 etc. can serve as a thermal source for the relatively higher temperature areas within the Conversion Vessel 308, V101 (this is the relatively "hot" side of the BPD), with either electrical or mechanical provisions to power the Chiller 310, CA101 as the thermal sink for the relatively "cold" side of the BPD. In this example, Chiller 310, CA101 is mounted to skid 312; collection vessel CV104 is mounted to skid 314, collection vessel CV103 is mounted to skid 316, collection vessel CV102 is mounted to skid 318, collection vessel CV101 is mounted to skid 320, and conversion vessel V101 is mounted to skid 322. In the example shown, feedstock vessels FV101, FV102, and FV103 are mounted in a stacked configuration on skid 324. The various vessels CV104, CV102, CV103, V101, FV101, FV102, and FV103 include access hatches 330, 332, 334, 336, 338, 340, 342, and 344, respectively. Collection vessels CV104, CV103, CV102, and CV101 have associated blowdown piping 350, 352, 354, 356, respectively and associated delivery piping 370, 372, 374, and 376, respectively. Conversion vessel V101 has associated blowdown piping 358, quick-fill piping 360, feedstock piping 362, and delivery piping 378. Feedstock vessels FV101, FV102, and FV103 have associated blowdown piping 364, 366, and 368. NGL vessel NGL101 has associated delivery piping 380 and LNG vessel LNG101 has associated delivery piping 382. As shown the vessels V101, CV101, CV102, CV103, and CV104 can each have an associated pressure relief valve 390. Conversion vessel V101 has an associated heater element 392, 138. Additional reference designations in FIG. 3A were originally introduced regarding FIG. 1 and correspond to the same or similar elements as referenced regarding FIG. 1.

As is more readily visible from the perspective of FIG. 3B, example processing system 300 corresponds to the system shown in FIG. 1. The location of blower B101 adjacent to collection vessel CV104 rather than between collection vessels CV104 and CV103 is one indication. FIG. 3B illustrates an example arrangement on skid 312 of Generator Apparatus GA101 on supports 326 over Chiller CA101, LNG vessel LNG101, NGL vessel NGL101, and associated piping, among other aspects of example system 300. Additional reference designations in FIG. 3B were originally introduced regarding FIG. 1 and correspond to the same or similar elements as referenced regarding FIG. 1.

FIG. 3C provides another perspective of the arrangement on skid 312 of Chiller CA101 with fans 328 having enough clearance for sufficient airflow, supports 326, Generator Apparatus GA101, LNG vessel LNG101, NGL vessel NGL101, and associated piping, among other aspects of example system 300.

FIG. 3D provides another perspective of the arrangement on skid 324 of pumps P100 and P101, and associated piping, among other aspects of example system 300.

Total emissions released during operation of the BPD produce a fraction of the pollution when compared to a conventional refinery. Therefore, the BPD itself, with its integral Feedback Closed Loop Vapor Transport System, can be considered near zero emissions, and close to pollution free.

Figure 4:
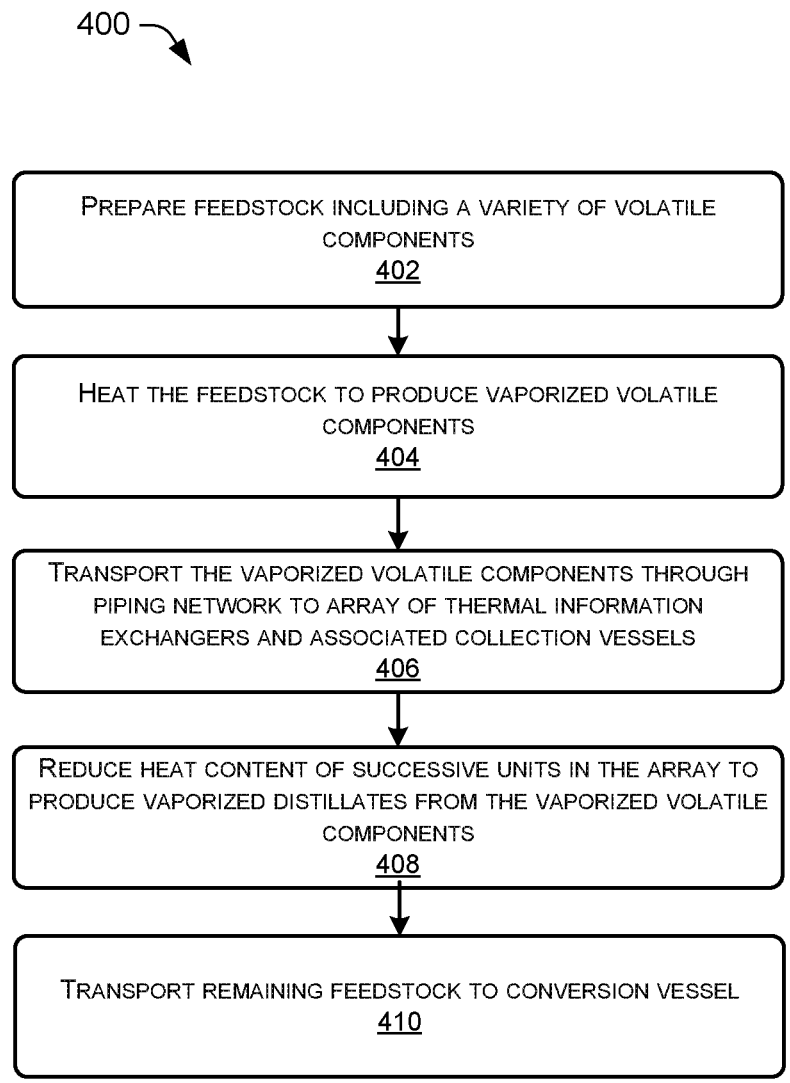
FIG. 4 is a flowchart illustrating an example method of processing feedstock into light through heavy volatile components and volatile and/or non-volatile residue of arbitrary spec as described herein.

FIG. 4 is a flowchart illustrating an example method of processing feedstock into light through heavy components and non-volatile residue as described herein. The method 400 illustrated by FIG. 4, can produce near-zero emissions.

Block 402 represents preparing feedstock 108 including a variety of volatile components. Block 404 represents heating the feedstock 108 to produce vaporized volatile components. Block 406 represents transporting the vaporized volatile components from block 404 through a piping network such as F100, F101, VP101, VP102, VP103 to an array of thermal information exchangers such as T101, T102, T103, T104 and associated collection vessels such as CV101, CV102, CV103, CV104. Block 408 represents reducing heat content of successive units such as T101/CV101, T102/CV102, T103/CV103, T104/CV104 in the array to produce vaporized distillates from the vaporized volatile components. Block 410 represents transporting remaining feedstock from the array of block 406 to conversion vessel V101 for heating and vaporization.

Descriptions of three example methods follow. Each provides a different strategy to obtain heavy residues, which are the most difficult products within the original feedstock to create, are highly energy and time intensive, and are generally the hardest on the Modular Unit Refinery equipment itself, especially given certain (difficult) specifications along with potentially marginal feedstock suitability properties. Two methods to obtain the heavy residue are herein termed a Continuous Method and a Batch Method; the third method is termed a Target Method, which can be performed on a second Modular Unit Refinery subsequent to Continuous Method BPD or Batch Method BPD operations.

Figure 5:
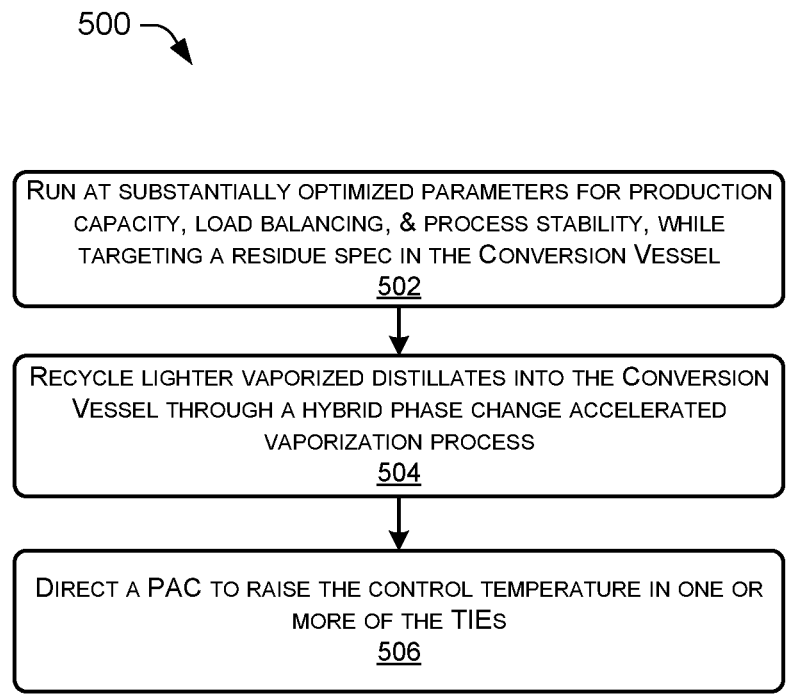
FIG. 5 is a flowchart illustrating an example method of processing feedstock into light through heavy volatile components and volatile and/or non-volatile residue of arbitrary spec as described herein.

FIG. 5 is a flowchart illustrating an example method of processing feedstock into light through heavy components and non-volatile residue as described herein. The method 500 illustrated by FIG. 5, can produce near-zero emissions and is known as a Continuous Method according to the present disclosure. Method 500 includes operations for a predetermined amount of time according to the following blocks. Block 502 represents running the process continuously at substantially optimized parameters for production capacity, load balancing, and process stability, while targeting a residue spec (for example, the Superpave PG Grade liquid asphalt spec) in the Conversion Vessel as the given criteria. In some examples, the Continuous Method process may be run fast enough and continuously at a low enough pressure that it can produce a heavy residue that meets the specified criteria within an acceptable production rate. In various examples, the process will include, as Block 504 represents, recycling one or more of the lighter vaporized distillates into the Conversion Vessel through the Hybrid Phase Change Accelerated Vaporization Process for the process to obtain the desired results. In some examples, this process can include, as Block 506 represents, directing the PAC to raise the control temperature in one or more of the "downstream" TIEs during this process, in order to create the desired result. If these continuous operational parameters are not able to reach and maintain the desired heavy residue spec, it may be possible to target a more relaxed criteria for the spec from the same family or range of products (for example, a Superpave PG 58 liquid asphalt target may be achievable and economically viable, in instances when a Superpave PG 64 liquid asphalt target spec may not be achievable).

Figure 6:
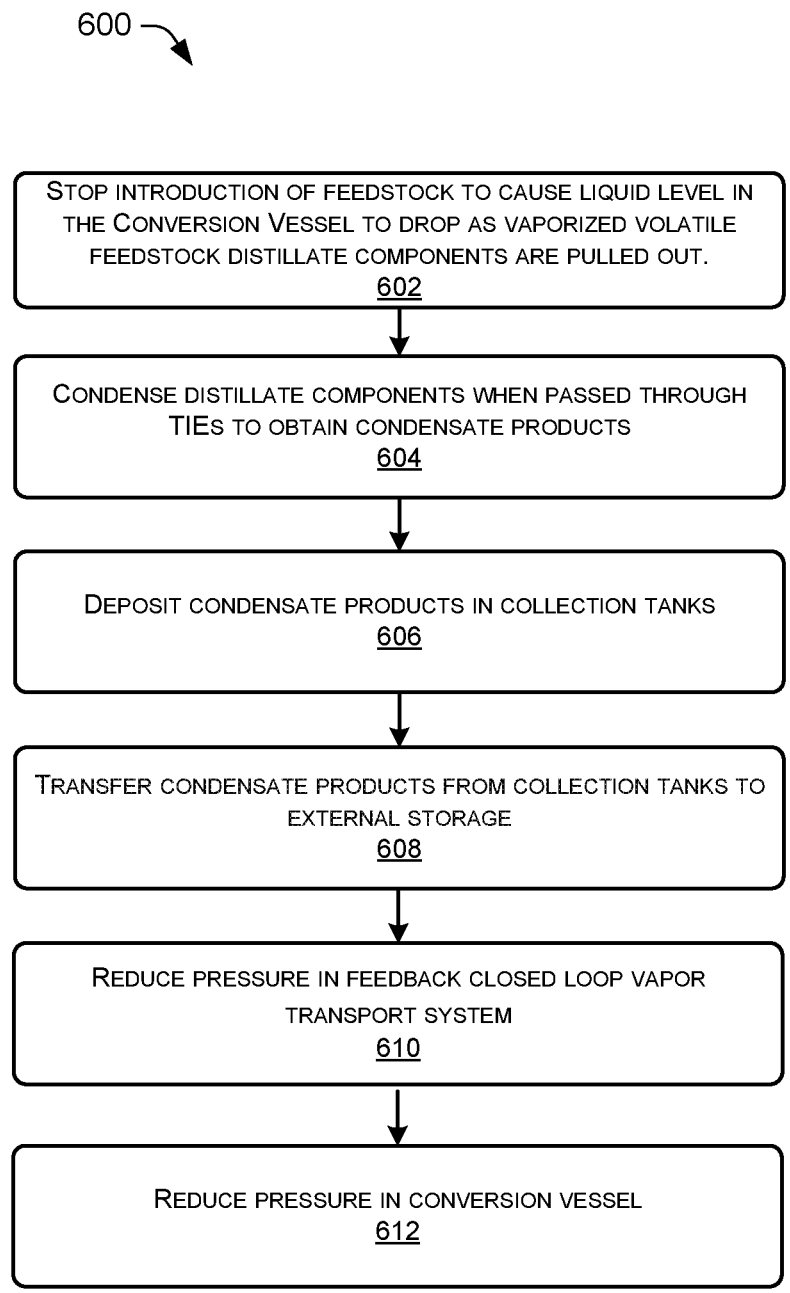
FIG. 6 is a flowchart illustrating an example method of processing feedstock into light through heavy volatile components and volatile and/or non-volatile residue of arbitrary spec as described herein.

FIG. 6 is a flowchart illustrating an example method of processing feedstock into light through heavy components and non-volatile residue as described herein. The method 600 illustrated by FIG. 6, can produce near-zero emissions and is known as a Batch Method according to the present disclosure. Method 600 includes operating on raw feedstock for a predetermined amount of time and stopping the introduction of additional raw feedstock during processing. Block 602 represents stopping introduction of feedstock causes the liquid level in the Conversion Vessel to begin to drop as the vaporized volatile feedstock distillate components are constantly being pulled out. As these distillate components are passed through the TIEs, they are condensed, as Block 604 represents, and become the individual condensate products being deposited in the Collection Tanks, as Block 606 represents.

As Block 608 represents, the collection tanks are substantially continuously pumped out to external storage facilities. During this process, the vapor chamber volume above the liquid feedstock in the Conversion Vessel increases, which correspondingly reduces the pressure on a system basis, including within the Conversion Vessel itself. The lightest and most volatile feedstock distillate components are vaporized and removed more rapidly than the heavier and less volatile distillate components. As a result, the system pressure of the mixed carrier gases and distillate vapors within the Feedback Closed Loop Vapor Transport System is further reduced as Block 610 represents, with a corresponding reduction in the pressure within the Vapor Camber in the Conversion Vessel above the remaining feedstock liquids as Block 612 represents. As the pressure is reduced, vaporization of those remaining very heavy yet volatile distillate components within the feedstock liquid is increased: a temperature increase initiated at this stage can increase this vaporization. The Batch Process can continue, while taking full advantage of the Hybrid Phase Change Accelerated Vaporization Process being maintained within the Conversion Vessel, until the desired Superpave PG 64 residue spec is reached; at which point the residue can be drained and collected, and the BPD would be initialized, and started again.

An optional Target Method according to the present disclosure includes initiating a process of either a continuous method or a batch method, when targeted residue spec (for example, the Superpave PG Grade liquid asphalt spec) in the Conversion Vessel has not been achieved within the predetermined amount of time. The optional Target Method includes collecting any remaining non-spec residue for storage and performing additional processing on the non-spec residue (in order to reach a certain residue spec) on another Modular Unit Refinery running alongside, or on the same Modular Unit Refinery at a later time. This may be accomplished by removing the non-spec residue from the Conversion Vessel after the predetermined time. In the case of a batch process, the predetermined time indicates the end of a batch, and the Target Method can operate on select cuts and the non-spec residue. In the case of a continuous process, the predetermined time indicates an optimized time limit, and the Target Method can operate on the non-spec residue. In both cases, the goal is to transfer the non-spec residue into its own separate process in order to maintain optimal production criteria for the primary Modular Unit Refinery (or Modular Unit Refinery Plant), while allowing more time for the additional or alternatively timed Modular Unit Refinery to tackle production of a difficult heavy residue spec using any of the strategies being disclosed herein.

This disclosure describes a number of particular features which can be employed in various combinations or separately, as each is useful separately without departure from the scope of this disclosure. While example illustrations are described in the present disclosure, it should be understood that the inventive concepts may be embodied otherwise than herein specifically illustrated or described, and that certain changes in form and/or arrangement of parts and/or the specific manner of practicing the technology described are anticipated.

We claim:

1. A method producing near-zero emissions via a closed-loop configuration, the method comprising:
   preparing feedstock including a variety of volatile components;
   heating the feedstock to produce vaporized volatile components;
   transporting the vaporized volatile components through a piping network to an array of thermal information exchangers and associated collection vessels;
   reducing heat content of successive units in the array to produce vaporized distillates from the vaporized volatile components; and
   transporting remaining feedstock to a conversion vessel for heating and vaporization, wherein the closed-loop configuration enables a near-zero emission system.

2. A method as claim 1 recites, further comprising at least one of:
   maintaining a successively lower temperature at successive thermal information exchangers through the use of the piping network connected to a chiller;
   maintaining a successively lower entropy at successive thermal information exchangers through the use of the piping network connected to the chiller;
   collecting distillates in order of cooling such that hottest distillates are collected first and successively cooler are collected in order of cooling within the thermal information exchangers; or
   condensing the distillates into cuts in a series of collection vessels that are successively cooler.

3. A method as claim 1 recites, wherein:
   the vaporized volatile components are produced in a conversion vessel;
   sparging occurs in the conversion vessel; and
   at least one of:
     the method further comprises introducing a heat source to the conversion vessel during operational phases; or
     the method further comprises introducing a heat source to the conversion vessel during operational phases, wherein distillate cuts are vaporized in the conversion vessel, the method further comprising condensing the distillate cuts through a series of successively cooler thermal information exchangers into associated collection vessels.

4. A method as claim 1 recites, wherein condensation occurs in the successive thermal information exchangers, the method further comprising:
   communicating, via a respective thermal information exchanger, at least one of: gas/vapor temperature, pressure, velocity, or mass flow information into the preceding and successive units in the array of thermal information exchangers and associated collection vessels; and
   collecting, via a respective collection vessel, a different range of distillate vapors, including that entrained range of distillate vapors cut in a gas/vapor stream within piping of the piping network at that point, such that at least a part of the entrained range of distillate vapors remaining past that point are to be condensed and collected in successive downstream units in the array of thermal information exchangers and associated collection vessels.

5. A method as claim 1 recites, wherein:
   at least one physical parameter of heat flow, pressure, velocity, or mass flow is controlled;
   heat flow, pressure, velocity, or mass flow data are collected or logged as digital sensor data; and
   total entropy increase associated with the physical parameter is minimized by using a resultant increase in entropy in one part of the system to decrease the entropy in another part of the system based on communication of the digital sensor data to a programmable automated controller.

6. A method as claim 5 recites, wherein:
   communication includes physical communication associated with the physical parameter and digital communication associated with the digital sensor data;
   thermal information is associated with the heat flow;
   dynamic information is associated with the mass flow;
   the physical communication conserves the thermal information and the dynamic information; and
   the digital communication at least one of: monitors, predicts, or controls for optimized parameters based on at least one of user input or equipment limitations.

7. A method as claim 1 recites, wherein, at least one of:
   using a closed-loop configuration, a chiller is configured to provide a cold-sink function, the cold-sink function allowing the thermal information exchangers in the successive units in the array of thermal information exchangers and associated collection of vessels to control incrementally lower temperatures; or
   using a closed-loop configuration, a chiller is configured to provide a cold-sink function, the cold-sink function allowing the thermal information exchangers in the successive units in the array of thermal information exchangers and associated collection vessels to control incrementally lower temperatures, wherein, the chiller is configured to control pressure of the feedback closed loop system by condensing a gas into a liquid within the closed loop.

8. A method as claim 1 recites, wherein, using a closed-loop configuration, a heat source, from a heater or from an exhaust, is configured to provide a hot-sink function, the hot-sink function allowing the thermal information exchangers to control incrementally higher temperatures in preceding units in the array of thermal information exchangers and associated collection vessels.

9. A method as claim 1 recites, further comprising at least one of:
transporting a heated product of combustion gas/vapor from an engine generator or direct combustion flame to recover heat from said product;
maintaining a substantially constant stepdown pressure in the array of thermal information exchangers;
controlling thermal flow, mass flow, pressure, and velocity to achieve a desired volatile or non-volatile heavy residue specification in a conversion vessel; or
controlling thermal flow, mass flow, pressure, and velocity to obtain a cut in a collection vessel of the collection vessels.

10. A system configured to perform a method as claim 1 recites comprising:
a collection vessel of the collection vessels;
a thermal information exchanger of the array of thermal information exchangers; and
piping of the piping network connecting the collection vessel and the thermal information exchanger; and
a chiller.

11. A modular unit refinery configured to perform a method as claim 1 recites.

12. A system comprising:
a conversion vessel;
a heater apparatus associated with the conversion vessel; and
a plurality of cooler modules in a closed-loop configuration, a cooler module of the plurality of cooler modules including a thermal information exchanger and a collection vessel, wherein the system is a closed-loop, near-zero emission system.

13. A system as claim 12 recites further comprising at least one of:
a chiller configured to provide a cold-sink function, wherein the chiller allows the thermal information exchangers to provide an incrementally lower temperature control;
a heat source configured to provide a hot-sink function, wherein the heat source allows the thermal information exchangers to provide an incrementally higher temperature control in preceding cooler modules of thermal information exchangers and associated collection vessels;
a heat source including at least one of: a molten salt bath, internal-combustion exhaust, or a renewable energy source; and the system including thermal transfer piping, wherein the heat source is configured to heat fluid in the thermal transfer piping; or
an engine generator; and an exhaust pipe connected to the engine generator, wherein the exhaust pipe is configured to transport a product of combustion vapor and configured to deliver exhaust heat from said product.

14. A system as claim 12 recites, wherein at least one of:
the system is configured to maintain a substantially constant stepdown pressure;
the system is configured to control thermal flow, mass flow, pressure, and velocity to achieve a desired volatile or non-volatile heavy residue specification in the conversion vessel;
the system is configured to control thermal flow, mass flow, pressure, and velocity to obtain a cut in the collection vessel: or
the system is configured for construction in a modular fashion such that one or more components is transportable to an installation site substantially assembled for operation.

15. A system as claim 12 recites, wherein:
the system is configured as a modular skid;
the modular skid is adapted to be transported substantially intact to an installation site; and at least one of:
the modular skid is adapted to be installed and operated at the installation site; or
the modular skid is adapted to be installed and operated at the installation site, wherein a plurality of the modular skids are configured to be located in close proximity to each other such that at least one of the modular skids is configured to be activated and/or deactivated to accomplish at least one of: flexibility in scale of production capacity; or enabling processing to obtain a greater number of cuts.

16. A system as claim 12 recites, wherein the system comprises thermal transfer piping configured to provide a thermal-sink regulating function, wherein the thermal transfer piping allows the thermal information exchangers to provide a higher temperature control in successive cooler modules of thermal information exchangers and associated collection vessels without requiring shutdown to release pressure in the system.

17. A modular unit refinery comprising a system as claim 12 recites.

18. A closed-loop binary process distillation apparatus comprising:
a collection vessel;
a thermal information exchanger associated with the collection vessel;
piping connecting the collection vessel and the thermal information exchanger;
a chiller configured to allow the thermal information exchangers to reduce gas/vapor temperature at near constant pressure within the thermal information exchanger and associated collection vessel.

19. A closed-loop binary process distillation apparatus as claim 18 recites, further comprising a heat source configured to allow the thermal information exchanger to increase gas/vapor temperature at near constant pressure within the thermal information exchanger and associated collection vessel.

20. A closed loop binary process distillation apparatus claim 18 recites, wherein at least one of:
the apparatus is configured for construction in a modular fashion such that one or more of the apparatuses is transportable to an installation site substantially assembled for operation;
the apparatus is a first apparatus, and the first apparatus is configured to be installed in connection with a second apparatus at an installation site;
the apparatus is configured to be installed in connection with components associated with a modular unit refinery at an installation site; or
the apparatus is configured as a modular skid; the modular skid is adapted to be transported substantially intact to an installation site; and the modular skid is adapted to be installed and operated at the installation site.

* * * * *